United States Patent
Miyauchi et al.

(10) Patent No.: US 10,047,246 B2
(45) Date of Patent: Aug. 14, 2018

(54) VARNISH INCLUDING 2-PHENYL-4,4'-DIAMINODIPHENYL ETHER, IMIDE RESIN COMPOSITION HAVING EXCELLENT MOLDABILITY, CURED RESIN MOLDED ARTICLE HAVING EXCELLENT BREAKING ELONGATION, PREPREG THEREOF, IMIDE PREPREG THEREOF, AND FIBER-REINFORCED MATERIAL THEREOF HAVING HIGH HEAT RESISTANCE AND EXCELLENT MECHANICAL STRENGTH

(71) Applicants: Kaneka Corporation, Osaka (JP); Japan Aerospace Exploration Agency, Tokyo (JP)

(72) Inventors: Masahiko Miyauchi, Osaka (JP); Yuichi Ishida, Tokyo (JP); Toshio Ogasawara, Tokyo (JP); Rikio Yokota, Kanagawa (JP)

(73) Assignees: Kaneka Corporation (JP); Japan Aerospace Exploration Agency (JP)

( * ) Notice: Subject to any disclaimer, the term of this patent is extended or adjusted under 35 U.S.C. 154(b) by 0 days.

(21) Appl. No.: 15/310,292

(22) PCT Filed: Apr. 20, 2015

(86) PCT No.: PCT/JP2015/061968
§ 371 (c)(1),
(2) Date: Nov. 10, 2016

(87) PCT Pub. No.: WO2015/174217
PCT Pub. Date: Nov. 19, 2015

(65) Prior Publication Data
US 2017/0152399 A1 Jun. 1, 2017

(30) Foreign Application Priority Data
May 12, 2014 (JP) .................................. 2014-098682

(51) Int. Cl.
*C08G 73/10* (2006.01)
*C09D 179/08* (2006.01)
(Continued)

(52) U.S. Cl.
CPC ....... *C09D 179/08* (2013.01); *C08G 73/1071* (2013.01); *C08J 5/18* (2013.01); *C08J 5/24* (2013.01); *C08J 2379/08* (2013.01)

(58) Field of Classification Search
CPC ...... C09D 179/08; C08K 3/0033; C08K 7/02; C08L 79/04; C08L 79/08; C08L 79/085
(Continued)

(56) References Cited

U.S. PATENT DOCUMENTS 6,281,323 B1 * 8/2001 Yokota ................ C07D 209/48
428/411.1
2005/0014925 A1 * 1/2005 Yokota ................ C07C 237/42
528/353
(Continued)

FOREIGN PATENT DOCUMENTS

JP 2000219741 A 8/2000
JP 2006312699 A 11/2006
(Continued)

OTHER PUBLICATIONS

Hergenrother et al., "Chemistry and properties of imide oligomers end-capped with phenylethynylphthalic anhydrides", Polymer vol. 35 No. 22, 1994, pp. 4857-4864.
(Continued)

*Primary Examiner* — Jane L Stanley
(74) *Attorney, Agent, or Firm* — Lerner, David, Littenberg, Krumholz & Mentlik, LLP

(57) ABSTRACT

Provided is a varnish including 1 to 500 parts by weight of an aromatic tetracarboxylic acid diester (A) represented by General Formula (1), 1 to 450 parts by weight of 2-phenyl-4,4'-diaminodiphenyl ether (B), 1 to 100 parts by weight of a 4-(2-phenylethynyl)phthalic acid monoester (C) represented by General Formula (2), and 100 parts by weight of an organic solvent having a boiling point of 150° C. or less at 1 atmosphere or a mixture of two or more of the organic solvents (D). The components (A), (B), and (C) are dissolved in the varnish.

(Continued)

[C. 1]

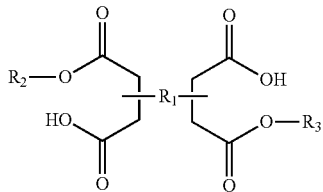

(1)

(In the formula, $R_1$ is an aromatic tetracarboxylic acid diester residue; $R_2$ and $R_3$ are the same or different and are an aliphatic organic group or an aromatic organic group.)

[C. 2]

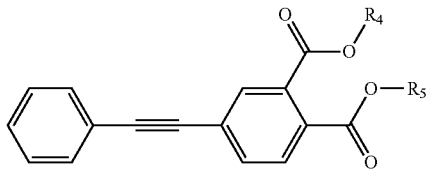

(2)

(In the formula, $R_4$ and $R_5$ are a hydrogen atom, an aliphatic organic group, or an aromatic organic group).

16 Claims, 1 Drawing Sheet

(51) Int. Cl.
*C08J 5/18* (2006.01)
*C08J 5/24* (2006.01)

(58) Field of Classification Search
USPC .......................................................... 524/600
See application file for complete search history.

(56) References Cited

U.S. PATENT DOCUMENTS

| | | |
|---|---|---|
| 2006/0270826 A1 | 11/2006 | Yamaguchi et al. |
| 2009/0011250 A1 | 1/2009 | Pater |
| 2009/0305046 A1* | 12/2009 | Bito ..................... C08G 73/105 |
| | | 428/409 |
| 2011/0165809 A1 | 7/2011 | Miyauchi et al. |

FOREIGN PATENT DOCUMENTS

| | | |
|---|---|---|
| JP | 2007308519 A | 11/2007 |
| WO | 2008127809 A1 | 10/2008 |
| WO | 2010027020 A1 | 3/2010 |
| WO | 2013141132 A1 | 9/2013 |

OTHER PUBLICATIONS

International Search Report for Application No. PCT/JP2015/061968 dated May 26, 2015.
Serafini et al., "Thermally Stable Polyimides from Solutions of Monomeric Reactants", Journal of Applied Polymer Science, vol. 16, pp. 905-915 (1972).
Serafini, Tito T., "PMR Polyimide Composites for Aerospace Applications", NASA Technical Memorandum 83047, (NASA-TM-83047) PMR Polyimide Composites N83-15364, First Technical Conference on Polyimides sponsored by the Society of Plastics Engineers, Inc., Nov. 10-12, 1982.
Yokota et al., "Molecular design of heat resistant polyimides having excellent processability and high glass transition temperature", Institute of Physics Publishing, High Performance Polymers 13 (2001) S61-S72.

* cited by examiner

[Fig. 1]
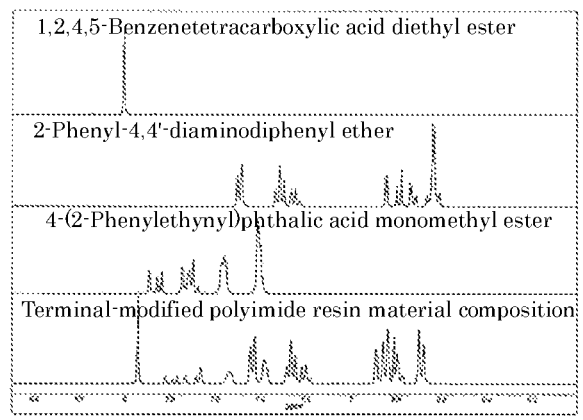
[Fig. 2]
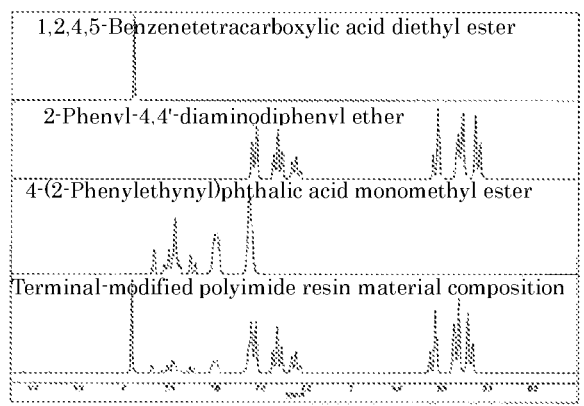

VARNISH INCLUDING 2-PHENYL-4,4'-DIAMINODIPHENYL ETHER, IMIDE RESIN COMPOSITION HAVING EXCELLENT MOLDABILITY, CURED RESIN MOLDED ARTICLE HAVING EXCELLENT BREAKING ELONGATION, PREPREG THEREOF, IMIDE PREPREG THEREOF, AND FIBER-REINFORCED MATERIAL THEREOF HAVING HIGH HEAT RESISTANCE AND EXCELLENT MECHANICAL STRENGTH

CROSS-REFERENCE TO RELATED APPLICATIONS

The present application is a national phase entry under 35 U.S.C. § 371 of International Application No. PCT/JP2015/061968 filed Apr. 20, 2015, published as International Publication No. WO 2015/174217 A1, which claims priority from Japanese Patent Application No. 2014-098682 filed May 12, 2014, all of which are incorporated herein by reference.

TECHNICAL FIELD

The present invention relates to a polyimide resin composition and a prepreg and a fiber-reinforced laminate including the composition, and specifically relates to member materials usable in various fields requiring excellent moldability and high heat resistance, including aircraft and apparatuses for the aerospace industry.

BACKGROUND ART

Aromatic polyimides are categorized into the highest level of heat resistance among polymers, also have excellent mechanical, electric, and other characteristics, and thus have been used as materials in various fields including the aerospace and the electronics.

Common aromatic polyimides are unsuitable to use particularly for melt molding or as the matrix resin of fiber-reinforced composite materials due to the poor processability.

To use the aromatic polyimide as the matrix resin for fiber-reinforced composite materials, thermal addition reactive polyimides are typically used as follows: the polyimides still having a low molecular weight is impregnated into fibers; and then the polyimides is crosslinked and cured in the final process. PMR-15 is exemplified as one of the representative examples of polyimide resins previously developed for fiber-reinforced composite materials. PMR-15 is a thermal addition reactive imide resin with about 1 to 6 of the repeating unit which has a main chain formed by condensation reaction between benzophenonetetracarboxylic acid diester and diaminodiphenylmethane, and 5-norbornene-2,3-dicarboxylic anhydride monoester (known as nadic anhydride) as an end-capping agent (Non-Patent Document 1 and Non-Patent Document 2).

The nadic acid at each terminal of PMR-15 undergoes crosslinking reaction through ring-opening addition reaction in thermal curing process, and is considered to generate no volatile component during the crosslinking reaction. The thermally cured PMR-15 resin exhibits a high glass transition temperature, and thus has been used as the matrix resin for fiber-reinforced composite materials.

The production of a PMR-15 prepreg is carried out by a process of dissolving benzophenonetetracarboxylic acid diester, diaminodiphenylmethane, and 5-norbornene-2,3-dicarboxylic anhydride monoester as the raw materials in various alcohols to give a solution and then impregnating fibers into the solution. The fiber-reinforced composite material is produced by the hot press molding of the prepreg stacked in advance under a vacuum condition.

Furthermore, imide oligomers prepared by using 4-(2-phenylethynyl)phthalic anhydride as the end-capping agent are considered to give excellent moldability of a composite material and excellent balance between the heat resistance and the mechanical characteristics of a produced composite material, and are described in Patent Document 1, Patent Document 2, Patent Document 3, Non-Patent Document 3, and Non-Patent Document 4, for example.

Patent Document 1 discloses the terminally modified imide oligomers that have a logarithmic viscosity number of 0.05 to 1, are obtained by the reaction of 2,3,3',4'-biphenyltetracarboxylic dianhydride having a bend; and non-planar structure, aromatic diamine compounds, and 4-(2-phenylethynyl)phthalic anhydride, and give cured products having good heat resistance and mechanical characteristics. Patent Document 1 also discloses that the invention can give a novel, highly practical terminally modified imide oligomer and a novel cured product of the terminally modified polyimide having good toughness and mechanical characteristics such as heat resistance, elastic modulus, tensile strength, and elongation, as the advantageous effects.

Another preparation process of a composite material has been studied as follows: an amic acid oligomer, which is the precursor of an imide oligomer, is dissolved in an organic solvent such as N-methyl-2-pyrrolidone; then the solution is infiltrated into fibers to give a semidried amic acid wet prepreg partially containing the solvent, as an intermediate; and a plurality of the prepregs are stacked and then heated and pressurized in a vacuum condition to yield a composite material.

In addition, Patent Document 2 discloses a terminally modified imide oligomer represented by General Formula (4) and a cured product of the oligomer.

[C. 1]

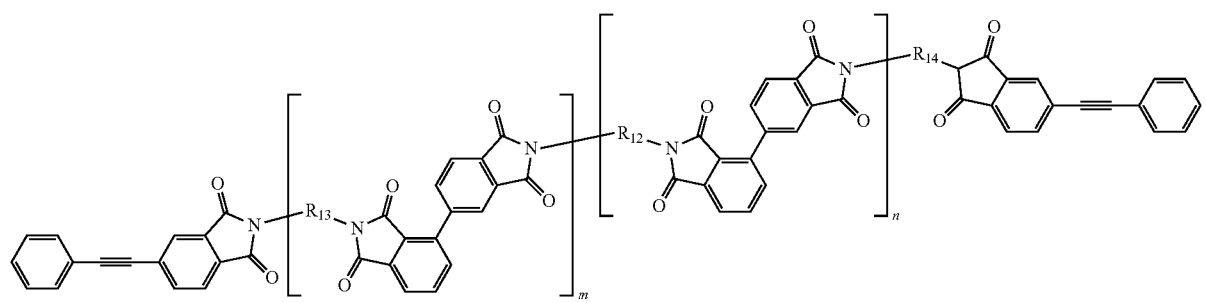

(4)

(In the formula, $R_{12}$, $R_{13}$, and $R_{14}$ are an aromatic diamine residue; $R_{12}$ is a divalent aromatic diamine residue derived from 9,9-bis(4-(4-aminophenoxy)phenyl)fluorene; m and n satisfy relations of n≥0 in the case of $R_{14}=R_{12}$, n≥1 in the case of $R_{14}=R_{13}$, m≥0, 1≤m+n≤20, and 0≤n/(m+n)≤1; and repeating units are optionally arranged in a block sequence or a random sequence.)

Patent Document 2 describes that the invention can give a terminally modified imide oligomer capable of being dissolved in organic solvents such as N-methyl-2-pyrrolidone at a high concentration and can give a novel cured product of the terminally modified polyimide having good toughness and mechanical characteristics such as heat resistance, elastic modulus, tensile strength, and elongation, as the advantageous effects.

In Patent Document 3, the inventors of the present invention have found that terminally modified aromatic imide oligomers by 4-(2-phenylethynyl)phthalic anhydride synthesized from aromatic diamines including 2-phenyl-4,4'-diaminodiphenyl ether, 1,2,4,5-benzenetetracarboxylic acid show high solvent solubility, excellent melt flowability and moldability at a high temperature, and give thermally cured products exhibiting excellent heat resistance and high mechanical characteristics.

In addition, the preparation of the composite materials has been studied as follows: the terminally modified imide oligomer is dissolved at a high concentration to give an imide oligomer solution; then the solution is impregnated into carbon fibers to give a semidried imide wet prepreg partially containing the solvent, as an intermediate; and a plurality of the prepregs are stacked and then subjected to thermal curing to yield a composite material. The preparation of the imide wet prepreg is for the purpose of uniformly attaching the imide oligomer solution onto the surface of carbon fibers.

Patent Document 4 discloses a cured product, a prepreg, and a fiber-reinforced composite material that are obtained by heating a solution prepared from an aromatic tetracarboxylic acid containing a 2,3,3',4',-biphenyltetracarboxylic acid component, an aromatic diamine containing no oxygen atom in the molecule, and an end-capping agent having a phenylethynyl group. Patent Document 4 describes that the invention can give a polyimide cured product having excellent heat resistance and oxidation resistance, as the advantageous effects.

CITATION LIST

Patent Literatures

Patent Document 1: JP-A No. 2000-219741
Patent Document 2: JP-A No. 2006-312699
Patent Document 3: International Publication WO 2010/027020
Patent Document 4: International Publication WO 2013/141132

Non-Patent Literatures

Non-Patent Document 1: Serafini, T. T.; Delvigs, P.; Lightsey, G. R., Journal of Applied Polymer Science, 1972, 16 (4), 905-915.
Non-Patent Document 2: Serafini, T. T., NASA Technical Memorandum, 83047, 1982.
Non-Patent Document 3: Hergenrother, P. M.; Smith Jr, J. G., Polymer, 1994, 35 (22), 4857-4864.
Non-Patent Document 4: Yokota, R.; Yamamoto, S.; Yano, S.; Sawaguchi, T.; Hasegawa, M.; Yamaguchi, H.; Ozawa, H.; Sato, R., High Performance Polymers, 2001, 13 (2), S61-S72.

SUMMARY OF INVENTION

Technical Problem

The above PMR-15 resin is an imide resin having an extremely small repeating unit number and a molecular weight of about 1,500 for achieving both the moldability of a composite material and the heat resistance after thermal curing, and thus has a disadvantage of low toughness of a cured resin after thermal crosslinking. In addition, diaminodiphenylmethane with high carcinogenicity is used, so that an operator who directly handles the resin might have been unfortunately affected by the diaminodiphenylmethane.

When post heat treatment is carried out at a temperature of 300° C. or higher in order to further increase the heat resistance of a cured resin of PMR-15, the terminal cross-linked moiety is thermally decomposed to generate cyclopentadiene as gas, which is likely to cause delamination in a fiber-reinforced composite material. PMR-15 thus has a disadvantage in molding processability for achieving a high quality composite material without voids or other defects in the material and a disadvantage of readily deteriorating mechanical properties of a composite material.

A wet prepreg of an amic acid oligomer or an imide oligomer having terminals modified with 4-(2-phenylethynyl)phthalic anhydride is produced by using highly polar organic solvents with high boiling points, such as N-methyl-2-pyrrolidone (boiling point: about 202° C.) and dimethylacetamide (boiling point: 165° C.). When these prepregs, especially 30 or more of the prepregs, are stacked to produce a carbon fiber composite material, it is difficult to completely remove the organic solvent from the prepregs because the solvent has a high boiling point and the intermolecular interaction between the imido group and the solvent molecule is typically high, and thus such prepregs have disadvantages of being likely to deteriorate the heat resistance and the mechanical characteristics of a carbon fiber composite material.

Such an imide cured resin molded article as described in Patent Document 4 has no flexible ether linkage which enables the molecular rotation, in the chemical structure of the cured resin moldings, for achieving the oxidation resistance at a high temperature, but it is commonly known that the cured resin molded article is likely to be brittle and to have low toughness. When a rotatable bonding group such as an ether bond is introduced into the molecular structure in order to improve the toughness of a cured resin molded article, it is commonly known that the heat resistance is likely to be greatly reduced.

In such circumstances, the present invention has an object to provide a varnish that is easily prepared by heating terminally modified imide oligomer having excellent solubility in an organic solvent with a boiling point of 150° C. or less at 1 atmosphere, solution storage stability, and moldability such as low melt viscosity, a solid imide resin composition including the terminally modified imide oligomer, and a cured product, a prepreg, an imide prepreg, and a fiber-reinforced composite material that are produced by using the solid imide resin composition and have high thermal and mechanical characteristics such as heat resistance, elastic modulus, tensile strength, and elongation.

Solution to Problem

The inventors of the present invention have intensively studied in order to solve the problems, and consequently have completed the present invention.

The present invention provides a varnish including components (A) to (D). The components (A), (B), and (C) are dissolved in the varnish; the component (A) is an aromatic tetracarboxylic acid diester represented by General Formula (1) and is contained in an amount of 1 to 500 parts by weight;

the component (B) is 2-phenyl-4,4'-diaminodiphenyl ether and is contained in an amount of 1 to 450 parts by weight;

the component (C) is a 4-(2-phenylethynyl)phthalic acid monoester represented by General Formula (2) and is contained in an amount of 1 to 400 parts by weight; and the component (D) is an organic solvent having a boiling point of 150° C. or less at 1 atmosphere or a mixture of two or more of the organic solvents and is contained in an amount of 100 parts by weight.

[C. 2]

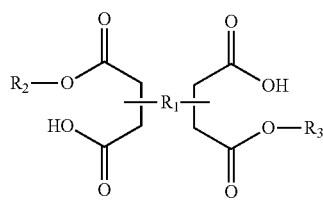

(1)

(In the formula, $R_1$ is an aromatic tetracarboxylic acid diester residue; $R_2$ and $R_3$ are the same or different and are an aliphatic organic group or an aromatic organic group; $R_2$ and $R_3$ are located in a cis configuration or a trans configuration; and the compound is optionally a single isomer or a mixture of two isomers)

[C. 3]

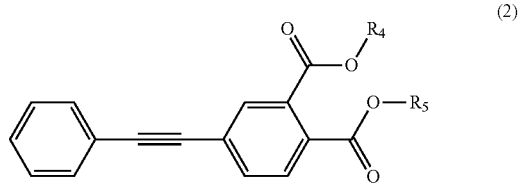

(2)

(In the formula, $R_4$ and $R_5$ are a hydrogen atom, an aliphatic organic group, or an aromatic organic group; and one of $R_4$ and $R_5$ is an aliphatic organic group or an aromatic organic group)

The aliphatic organic group represented by $R_2$ and $R_3$ in General Formula (1) is an organic group having an aliphatic chain, and the aromatic organic group is an organic group having an aromatic ring.

The aromatic tetracarboxylic acid diester residue represented by $R_1$ in General Formula (1) is a tetravalent aromatic organic group formed by removing four carboxyl groups from an aromatic tetracarboxylic acid.

In General Formula (1), the aromatic tetracarboxylic acid diester residue represented by $R_1$ is preferably a tetravalent residue of a 1,2,4,5-benzenetetracarboxylic acid or a tetravalent residue of a 3,3',4,4'-biphenyltetracarboxylic acid.

In General Formula (1), $R_1$ may be a combination of two or more of a tetravalent aromatic tetracarboxylic acid diester represented by a tetravalent residue of a 1,2,4,5-benzenetetracarboxylic acid, an aromatic tetracarboxylic acid diester represented by a tetravalent residue of a 3,3',4,4'-biphenyltetracarboxylic acid, and an aromatic tetracarboxylic acid diester represented by a tetravalent residue of a bis(3,4-carboxyphenyl) ether.

The aliphatic organic group represented by $R_4$ or $R_5$ in General Formula (2) is an organic group having an aliphatic chain, and the aromatic organic group is an organic group having an aromatic ring.

In the varnish, 2-phenyl-4,4'-diaminodiphenyl ether and two or more of divalent aromatic diamines may be used in combination.

The present invention also provides a solid imide resin composition represented by General Formula (3). The solid imide resin composition is produced by heating the varnish to remove the organic solvent.

[C. 4]

(3)

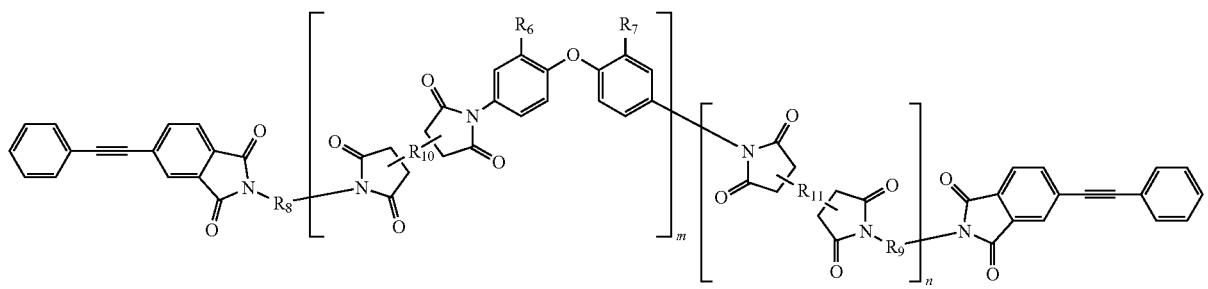

(In the formula, $R_6$ and $R_7$ is a hydrogen atom or a phenyl group; one of $R_6$ and $R_7$ is a phenyl group; $R_8$ and $R_9$ are the same or different and are a divalent aromatic diamine residue; $R_{10}$ and $R_{11}$ are the same or different and are a tetravalent aromatic tetracarboxylic acid residue; m and n satisfy relations of m≥1, n≥0, 1≤m+n≤10, and 0.05≤m/(m+n)≤1; and repeating units are optionally arranged in a block sequence or a random sequence.)

The present invention further provides a molded article of a polymerized imide resin composition, in which the polymerized imide resin composition is obtained by heating the solid imide resin composition in a molten state.

In the molded article, the imide resin composition has a glass transition temperature (Tg) of 300° C. or more, more preferably 330° C. or more, and even more preferably 350° C. or more.

The present invention also provides a film obtained from the molded article of the imide resin composition. The film preferably has a tensile elongation at break of 10% or more, more preferably 15% or more, and even more preferably 20% or more.

The present invention further provides a prepreg including the varnish and fibers into which the varnish is filtrated. The present invention provides both a wet prepreg that contains a solvent and a dry prepreg from which a solvent is substantially completely removed.

The present invention also provides an imide prepreg obtained by further heating the prepreg. The present invention provides both a semidried imide wet prepreg that partially contains a solvent and an imide dry prepreg from which a solvent is substantially completely removed.

The present invention also provides a fiber-reinforced composite material obtained by stacking the prepregs, the imide prepregs, or a combination of the prepregs and the imide prepregs and thermally curing the stacked prepregs. The fiber-reinforced composite material preferably has a Tg of 300° C. or more and more preferably 330° C. or more.

The present invention further provides a method of producing the varnish. The method includes heating an aromatic tetracarboxylic anhydride and 4-(2-phenylethynyl)phthalic anhydride in a state the aromatic tetracarboxylic anhydride and the 4-(2-phenylethynyl)phthalic anhydride are dissolved in an organic solvent having a boiling point of 150° C. or less at 1 atmosphere, to prepare an aromatic tetracarboxylic acid diester represented by General Formula (1); preparing a solution of an organic solvent having a boiling point of 150° C. or less at 1 atmosphere, which contains the aromatic tetracarboxylic acid diester represented by General Formula (1) and a 4-(2-phenylethynyl)phthalic acid monoester represented by General Formula (2); adding a diamine including 2-phenyl-4,4'-diaminodiphenyl ether to the solution; and uniformly dissolving, in the solution, the diamine including 2-phenyl-4,4'-diaminodiphenyl ether.

Advantageous Effects of Invention

The present invention can provide the varnish having excellent solubility and long-term storage stability due to the effect of 2-phenyl-4,4'-diaminodiphenyl ether.

The present invention can also provide the solid imide resin composition having excellent melt flowability at high temperature and molding processability, by heating the varnish to give a particular terminally modified imide oligomer component.

The present invention can provide the imide resin molded article having both high heat resistance and excellent breaking elongation, by further heating the solid imide resin composition to polymerize the terminally modified imide oligomer component.

The present invention can provide the imide prepreg having excellent preservability and handling properties and achieving excellent adhesion properties between prepregs, by infiltrating the varnish into fibers.

The prepreg or the imide prepreg of the present invention can readily yield a high quality fiber-reinforced composite material having excellent heat resistance and mechanical characteristics and containing no large voids in the material because the organic solvent having a low boiling point used in the varnish is readily removed from a composite material prepared by stacking the prepregs or the imide prepregs, in a step of thermoforming the composite material.

BRIEF DESCRIPTION OF THE DRAWINGS

FIG. 1 is a view showing a $^1$H-NMR measurement result of the raw material composition of the terminally modified polyimide resin that was powdered by drying a varnish obtained in Example 1 under vacuum at room temperature and was dissolved in MeOH-d$_4$.

FIG. 2 is a view showing a $^1$H-NMR measurement result of the powdered raw material composition of the terminally modified polyimide resin that was obtained in Example 1 and was dissolved in DMSO-d$_6$.

DESCRIPTION OF EMBODIMENTS

1. Varnish

A varnish of the present invention is characterized by including the following components (A) to (D), and the components (A), (B), and (C) are dissolved in the varnish.

The component (A) is an aromatic tetracarboxylic acid diester represented by General Formula (1) and is contained in an amount of 1 to 500 parts by weight;
the component (B) is 2-phenyl-4,4'-diaminodiphenyl ether and is contained in an amount of 1 to 450 parts by weight;
the component (C) is a 4-(2-phenylethynyl)phthalic acid monoester represented by General Formula (2) and is contained in an amount of 1 to 400 parts by weight; and
the component (D) is an organic solvent having a boiling point of 150° C. or less at 1 atmosphere or a mixture of two or more of the organic solvents and is contained in an amount of 100 parts by weight.

[C. 5]

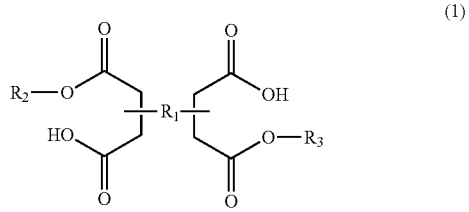

(1)

(In the formula, $R_1$ is an aromatic tetracarboxylic acid diester residue; $R_2$ and $R_3$ are the same or different and are an aliphatic organic group or an aromatic organic group; $R_2$ and $R_3$ are located in a cis configuration or a trans configuration; and the compound is optionally a single isomer or a mixture of two isomers)

[C. 6]

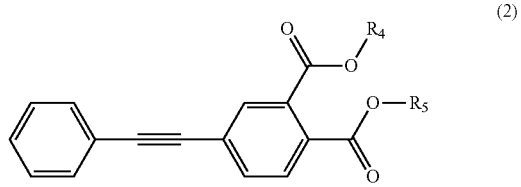

(2)

(In the formula, $R_4$ and $R_5$ are a hydrogen atom, an aliphatic organic group, or an aromatic organic group; and one of $R_4$ and $R_5$ is an aliphatic organic group or an aromatic organic group)

(Component (A))

As a component of the varnish of the present invention, the aromatic tetracarboxylic acid diester represented by General Formula (1) is used. The aromatic tetracarboxylic acid diester represented by General Formula (1) is a component that reacts with the components (B) and (C) to form a part of the skeleton of the terminally modified imide oligomer represented by General Formula (3).

The aromatic tetracarboxylic acid constituting the aromatic tetracarboxylic acid diester residue represented by $R_1$ in General Formula (1) is exemplified by tetravalent residues of 1,2,4,5-benzenetetracarboxylic acids, tetravalent residues of 3,3',4,4'-biphenyltetracarboxylic acids, and tetravalent residues of bis(3,4-carboxyphenyl) ethers.

In the aromatic tetracarboxylic acid diesters included in the varnish, specifically, the aromatic tetracarboxylic acid diester residue represented by $R_1$ in General Formula (1) is preferably a tetravalent residue of a 1,2,4,5-benzenetetracarboxylic acid, a tetravalent residue of a 3,3',4,4'-biphenyltetracarboxylic acid, or a tetravalent residue of a bis(3, 4-carboxyphenyl) ether, and more preferably a tetravalent residue of a 1,2,4,5-benzenetetracarboxylic acid or a tetravalent residue of a 3,3',4,4'-biphenyltetracarboxylic acid because a molded article of an imide resin composition can achieve a high glass transition temperature (Tg), long-term thermal stability, and anti-oxidation stability at high temperature.

In the aromatic tetracarboxylic acid diesters included in the varnish, in addition to the above, preferred examples of the combination of tetravalent aromatic tetracarboxylic acids include a combination partially containing a tetravalent residue of a 1,2,4,5-benzenetetracarboxylic acid and containing a tetravalent residue of a 3,3',4,4'-biphenyltetracarboxylic acid as the remainder; a combination partially containing a tetravalent residue of a 1,2,4,5-benzenetetracarboxylic acid and containing a tetravalent residue of a bis(3,4-carboxyphenyl) ether as the remainder; and a combination partially containing a tetravalent residue of a 3,3', 4,4'-biphenyltetracarboxylic acid and containing a tetravalent residue of a bis(3,4-carboxyphenyl) ether as the remainder.

The aliphatic organic group or the aromatic organic group represented by $R_2$ and $R_3$ in General Formula (1) is preferably an organic group having 1 to 12 carbon atoms, more preferably an organic group having 1 to 9 carbon atoms, and even more preferably an organic group having 1 to 6 carbon atoms because an alcohol component that is generated and eliminated by amic acid formation reaction with a diamine by heat preferably has a low boiling point in order to be immediately volatilized and removed during production of the imide resin composition or molding of the composite material.

The aromatic tetracarboxylic acid diester represented by General Formula (1) is basically a 1,2,4,5-benzenetetracarboxylic acid diester, a 3,3',4,4'-biphenyltetracarboxylic acid diester, a combination of them, a 1,2,4,5-benzenetetracarboxylic acid diester that is partially replaced with a diester of bis(3,4-carboxyphenyl) ether, or a 3,3',4,4'-biphenyltetracarboxylic acid diester that is partially replaced with a diester of bis(3,4-carboxyphenyl) ether. A 1,2,4,5-benzenetetracarboxylic acid diester, a 3,3',4,4'-biphenyltetracarboxylic acid diester, or a diester of bis(3,4-carboxyphenyl) ether may be partially replaced with an additional aromatic tetracarboxylic acid as long as the advantageous effects of the invention are achieved.

Examples of the additional aromatic tetracarboxylic acid include 3,3',4,4'-benzophenonetetracarboxylic dianhydride (BTDA), 2,3,3',4'-biphenyltetracarboxylic dianhydride (a-BPDA), 2,2',3,3'-biphenyltetracarboxylic dianhydride (i-BPDA), 2,2-bis(3,4-dicarboxyphenyl)methane dianhydride, bis(3,4-carboxyphenyl) ether dianhydride, and 1,2,3, 4-benzenetetracarboxylic dianhydride. The additional aromatic tetracarboxylic acids may be used singly or in combination of two or more of them.

The aromatic tetracarboxylic acid diester represented by Formula (1) includes 1,2,4,5-benzenetetracarboxylic acid dimethyl ester, 1,2,4,5-benzenetetracarboxylic acid diethyl ester, 1,2,4,5-benzenetetracarboxylic acid dipropyl ester, 1,2,4,5-benzenetetracarboxylic acid diisopropyl ester, 1,2,4, 5-benzenetetracarboxylic acid dibutyl ester, and other isomers of these compounds in terms of two ester groups, but is not necessarily limited to them. Two ester groups are not necessarily the same.

Among them, 1,2,4,5-benzenetetracarboxylic acid dimethyl ester and 1,2,4,5-benzenetetracarboxylic acid diethyl ester are preferred because a resin after thermal curing can achieve a high glass transition temperature.

(Component (B))

As a component of the varnish of the present invention, 2-phenyl-4,4'-diaminodiphenyl ether is used. The use of the component allows the terminally modified imide oligomer represented by General Formula (3) to have the skeleton derived from the 2-phenyl-4,4'-diaminodiphenyl ether in the molecule. In the present invention, the 2-phenyl-4,4'-diaminodiphenyl ether may be partially replaced with an additional aromatic diamine.

Examples of the additional aromatic diamine include 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodiphenyl ether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4''-aminophenoxy)phenyl]hexafluoropropane, 9,9-bis(4-aminophenyl)fluorene, and 9,9-bis(4-(4-aminophenoxy)phenyl)fluorene. These diamines may be used singly or in combination of two or more of them. The aromatic diamine compound is particularly preferably 9,9-bis(4-aminophenyl)fluorene, 9,9-bis(4-(4-aminophenoxy)phenyl)fluorene, or 1,3-diaminobenzene. For applications requiring higher heat resistance and mechanical strength, the aromatic diamine compounds are preferably copolymerized, and the copolymer is used in an amount of 0 to 50% by mole, preferably 0 to 25% by mole, and more preferably 0 to 10% by mole relative to the total amount of diamines. The diamine for copolymerization is particularly preferably 9,9-bis(4-aminophenyl)fluorene. This allows an imide oligomer obtained by heating to exhibit excellent moldability and allows a cured product after thermal curing to exhibit high heat resistance and excellent mechanical characteristics, achieving excellent effects. Needless to say, a copolymer is not necessarily used in the present invention depending on an application.

(Component (C))

As a component of the varnish of the present invention, the 4-(2-phenylethynyl)phthalic acid monoester represented by General Formula (2) is used. The 4-(2-phenylethynyl) phthalic acid monoester represented by General Formula (2) is a component that reacts with the components (A) and (B) to form a part of the skeleton of the imide resin composition represented by General Formula (3) described later.

The aliphatic organic group or the aromatic organic group represented by $R_4$ or $R_5$ in General Formula (2) is preferably an organic group having 1 to 12 carbon atoms, more preferably an organic group having 1 to 9 carbon atoms, and even more preferably an organic group having 1 to 6 carbon atoms because an alcohol component that is generated and eliminated by amic acid formation reaction with a diamine by heat preferably has a low boiling point in order to be immediately volatilized and removed during production of the imide resin composition or molding of the composite material.

Examples of the 4-(2-phenylethynyl)phthalic acid monoester represented by General Formula (2) include, but are not necessarily limited to, 4-(2-phenylethynyl)phthalic acid monoethyl ester, 4-(2-phenylethynyl)phthalic acid monomethyl ester, 4-(2-phenylethynyl)phthalic acid monopropyl ester, 4-(2-phenylethynyl)phthalic acid monoisopropyl ester, and 4-(2-phenylethynyl)phthalic acid monobutyl ester.

(Component (D))

The organic solvent used for the preparation of the varnish is a solvent having a boiling point of 150° C. or less at 1 atmosphere and is preferably a solvent having a boiling point of 100° C. or less in order to be immediately volatilized and removed during synthesis of the imide oligomer by heat.

Examples of the organic solvent include methanol (boiling point: about 65° C.), ethanol (boiling point: about 78° C.), 2-propanol (boiling point: about 82° C.), 1-propanol (boiling point: about 97° C.), acetone (boiling point: about 56° C.), tetrahydrofuran (boiling point: about 66° C.), 1,4-dioxane (boiling point: about 101° C.), and methyl ethyl ketone (boiling point: about 79° C.). These organic solvents may be used singly or as a mixture of two or more of them.

(Amount)

In order to produce a prepreg in which the varnish is sufficiently infiltrated into monofilaments of fibers and to produce a fiber-reinforced composite material exhibiting higher heat resistance, the amount of the aromatic tetracarboxylic acid diester represented by General Formula (1) included in the varnish is 1 to 500 parts by weight, preferably 20 to 280 parts by weight, and more preferably 40 to 200 parts by weight relative to 100 parts by weight of the organic solvent.

From the same viewpoint as the above, the amount of the 2-phenyl-4,4'-diaminodiphenyl ether is 1 to 450 parts by weight, preferably 40 to 400 parts by weight, and more preferably 40 to 280 parts by weight relative to 100 parts by weight of the organic solvent.

From the same viewpoint as the above, the amount of the 4-(2-phenylethynyl)phthalic acid monoester represented by General Formula (2) is 1 to 400 parts by weight, preferably 5 to 100 parts by weight, and more preferably 10 to 80 parts by weight relative to 100 parts by weight of the organic solvent.

(Production Method)

In the varnish, each of the aromatic tetracarboxylic acid diester represented by General Formula (1), the 2-phenyl-4,4'-diaminodiphenyl ether, and the 4-(2-phenylethynyl) phthalic acid monoester represented by General Formula (2) is in a dissolved state in the organic solvent. Here, the dissolved state means the condition in which each component is substantially uniformly dissolved in an organic solvent to such an extent that each component is not visually observed and the components are present without reacting with each other. The condition in which each component is present can be observed by the method described in Example 1.

The varnish of the present invention can be obtained by mixing the aromatic tetracarboxylic acid diester represented by General Formula (1), the aromatic diamine including 2-phenyl-4,4'-diaminodiphenyl ether, and the 4-(2-phenylethynyl)phthalic acid monoester represented by General Formula (2) in the organic solvent in such a manner that the total amount of ester groups is substantially the same as the total amount of primary amino groups while the amount of each component is adjusted within the above parts by weight.

In particular, in order to form a sufficient amount of the imide resin composition during a molding step and to produce a prepreg in which the imide resin composition is in close contact with fibers for the production of a fiber-reinforced composite material exhibiting excellent mechanical strength, the aromatic tetracarboxylic acid diester represented by General Formula (1), the aromatic diamine including 2-phenyl-4,4'-diaminodiphenyl ether, and the 4-(2-phenylethynyl)phthalic acid monoester represented by General Formula (2) are preferably uniformly dissolved in the organic solvent in the varnish in a total solid content concentration of 50% by weight or more at room temperature.

Examples of the production method will next be described in detail.

For example, the varnish of the present invention can be produced by using the components in such a manner that the total molar amount of ester groups of one or two or more of the aromatic tetracarboxylic acid diester compounds and the 4-(2-phenylethynyl)phthalic acid monoester is substantially the same as the total molar amount of amino groups of the aromatic diamine including 2-phenyl-4,4'-diaminodiphenyl ether, and stirring the components in the organic solvent preferably at a temperature of 60° C. or less and particularly preferably 40° C. or less to uniformly dissolve the components.

The varnish of the present invention can also be obtained through successive steps including a step of using an anhydride of an aromatic tetracarboxylic acid as the starting material and carrying out diesterification using an alcohol as the reaction solution. For example, one or two or more of the aromatic tetracarboxylic anhydrides and 4-(2-phenylethynyl)phthalic anhydride are heated, refluxed, and stirred in an alcohol solvent at a temperature of 100° C. or less, particularly 80° C. or less, and the aromatic tetracarboxylic acid diester represented by General Formula (1) is synthesized. If needed, the solvent is removed, and the aromatic tetracarboxylic acid diester represented by General Formula (1) is isolated. The aromatic diamine including 2-phenyl-4,4'-diaminodiphenyl ether is used in such a manner that the total molar amount of ester groups of all the components is substantially the same as the total molar amount of amino groups, and the components are stirred in an organic solvent preferably at a temperature of 60° C. or less, particularly preferably 40° C. or less, to be uniformly dissolved, yielding the varnish.

The varnish prepared as above may be concentrated by partially volatilizing the organic solvent used or may be diluted by freshly adding the organic solvent, if the solid content concentration is required to be adjusted. Alternatively, by completely volatilizing the organic solvent used, a solid material composition of the varnish in which the components are uniformly mixed may be isolated. The isolated material composition can be dissolved in an organic solvent to give the varnish once again, as needed. The varnish or the solid material composition undergoes no reaction of forming a terminally modified amic acid oligomer "having an amide-acid bond" (also called amic acid oligomer) when stored at room temperature or a temperature equal to or lower than the room temperature, and can be stably stored for a long period of time.

A preferred method for producing the varnish of the present invention is exemplified by a method including a step of synthesizing an aromatic tetracarboxylic acid diester (A) represented by General Formula (1) and a 4-(2-phenylethynyl)phthalic acid monoester (C) represented by General Formula (2) and a step of preparing a varnish by adding an aromatic diamine (B) including 2-phenyl-4,4'-diaminodiphenyl ether.

First, in the step of synthesizing an aromatic tetracarboxylic acid diester (A) represented by General Formula (1) and a 4-(2-phenylethynyl)phthalic acid monoester (C) represented by General Formula (2), the aromatic tetracarboxylic anhydride and 4-(2-phenylethynyl)phthalic anhydride are added to an organic solvent having a boiling point of 150° C. or less at 1 atmosphere, a solution or a suspension in which the respective added components are uniformly dissolved is heated at a reaction temperature of about 30 to 100° C. and stirred for about 1 to 360 minutes, and then is cooled to give a solution in which all the aromatic tetracarboxylic acid diester (A) represented by General Formula (1) and the 4-(2-phenylethynyl)phthalic acid monoester (C) represented by General Formula (2) are uniformly dissolved in the organic solvent or a solution in a suspension state in which the aromatic tetracarboxylic acid diester (A) represented by General Formula (1) and the 4-(2-phenylethynyl)phthalic acid monoester (C) represented by General Formula (2) are partially dissolved in the organic solvent. At the time, the organic solvent can be partially or completely volatilized to concentrate the solution, if needed.

In the step of preparing a varnish, the aromatic diamine (B) including 2-phenyl-4,4'-diaminodiphenyl ether is added to the solution in the organic solvent, and the resulting solution in the organic solvent is stirred at a reaction temperature of about 5 to 50° C. for about 1 to 360 minutes, yielding a solution (varnish) in the organic solvent in which all the components are uniformly dissolved.

The varnish of the present invention may have any solution viscosity as long as the advantageous effects of the invention are achieved, but the solution viscosity is preferably 5,000 poise or more, more preferably 8,000 poise or more, and even more preferably 10,000 poise or more, at 25° C. The solution viscosity is determined by the method described in examples.

2. Imide Resin Composition

The varnish is heated to react the component (A), the component (B), and the component (C) with each other, giving a terminally modified amic acid oligomer. Next, the amic acid oligomer is dehydrated and cyclized, yielding an imide resin composition containing the terminally modified imide oligomer represented by General Formula (3) having a 4-(2-phenylethynyl)phthalic acid residue at terminals.

The dehydration and cyclization method of the amic acid oligomer is exemplified by a method of adding an imidizing agent at a temperature of about 0 to 140° C. and a method of heating the oligomer at a temperature of 140 to 275° C.

In the obtained terminal-modified imide oligomer, it is desirable that the thermally reactive substituent at each terminal do not cause polymerization reaction. The obtained imide resin composition may be in a varnish form in which the composition is dissolved in an organic solvent, a semi-dried paste form, or a completely dried solid form. In particular, the completely dried solid form can have excellent melt flowability at high temperature and excellent molding processability.

[C.7]

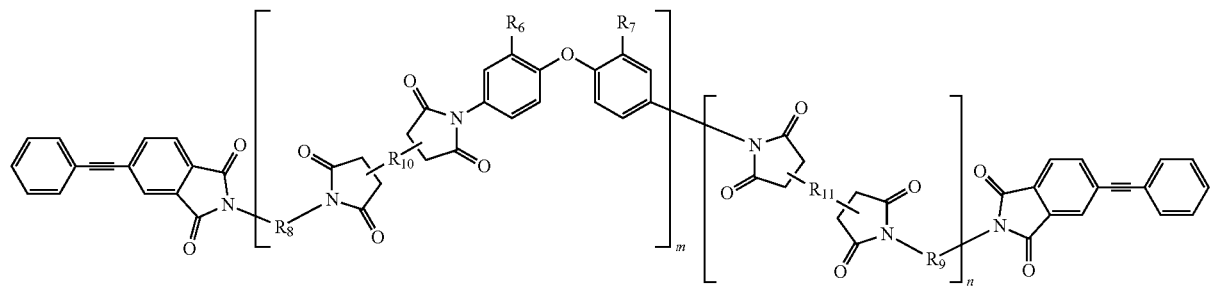

(3)

(In the formula, $R_6$ and $R_7$ are a hydrogen atom or a phenyl group; one of $R_6$ and $R_7$ is a phenyl group; $R_8$ and $R_9$ are the same or different and are a divalent aromatic diamine residue; $R_{10}$ and $R_{11}$ are the same or different and are a tetravalent aromatic tetracarboxylic acid residue; m and n satisfy relations of m≥1, n≥0, 1≤m+n≤10, and 0.05≤m/(m+n)≤1; and repeating units are optionally arranged in a block sequence or a random sequence.)

The aromatic diamine residue represented by $R_8$ and $R_9$ in General Formula (3) means a divalent aromatic organic group formed by removing two amino groups from an aromatic diamine. The aromatic tetracarboxylic acid residue means a tetravalent aromatic organic group formed by removing four carboxyl groups from an aromatic tetracarboxylic acid. Here, the aromatic organic group is an organic group having an aromatic ring. The aromatic organic group is preferably an organic group having 4 to 40 carbon atoms, more preferably an organic group having 4 to 30 carbon atoms, and even more preferably an organic group having 4 to 20 carbon atoms.

The aromatic tetracarboxylic acid constituting the tetravalent aromatic tetracarboxylic acid residue represented by $R_{10}$ and $R_{11}$ in General Formula (3) is preferably a 1,2,4,5-benzenetetracarboxylic acid, a 3,3',4,4'-biphenyltetracarboxylic acid, or a bis(3,4-carboxyphenyl) ether, and specifically preferably 1,2,4,5-benzenetetracarboxylic dianhydride and 3,3',4,4'-biphenyltetracarboxylic dianhydride.

In the terminally modified imide oligomer in the imide resin composition of the present invention, it is preferable that some of m pieces of $R_{10}$ and n pieces of $R_{11}$ in General Formula (3) be a tetravalent residue of a 1,2,4,5-benzenetetracarboxylic acid, and the remainder of them be a tetravalent residue of a 3,3',4,4'-biphenyltetracarboxylic acid.

In General Formula (3), if m+n is less than 1, a cured resin may have extremely lower toughness, whereas if m+n is more than 10, a composition may not exhibit excellent melt flowability at high temperature conditions. In General Formula (3) and General Formulae (5) and (6), m/(m+n) is preferably 0.1 or more and 1 or less.

In General Formula (3) in the imide resin composition of the present invention, it is preferable that the tetravalent aromatic tetracarboxylic acid residue represented by $R_{10}$ and $R_{11}$ be a tetravalent residue of a 1,2,4,5-benzenetetracarboxylic acid, and the terminally modified imide oligomer be the compound represented by General Formula (5).

[C.8]

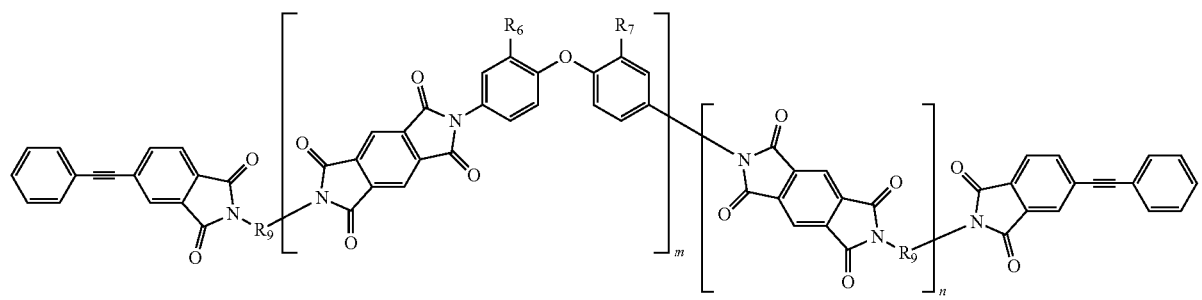

(5)

(In the formula (5), $R_6$ and $R_7$ are a hydrogen atom or a phenyl group; one of $R_6$ and $R_7$ is a phenyl group; $R_8$ and $R_9$ are the same or different and are a divalent aromatic diamine residue; m and n satisfy relations of m≥1, n≥0, 1≤m+n≤10, and 0.05≤m/(m+n)≤1; and repeating units are optionally arranged in a block sequence or a random sequence.)

In General Formula (3) in the imide resin composition of the present invention, it is preferable that the tetravalent aromatic tetracarboxylic acid residue represented by $R_{10}$ and $R_{11}$ be a tetravalent residue of a 3,3',4,4'-biphenyltetracarboxylic acid, and the terminally modified imide oligomer be the compound represented by General Formula (6).

[C. 9]

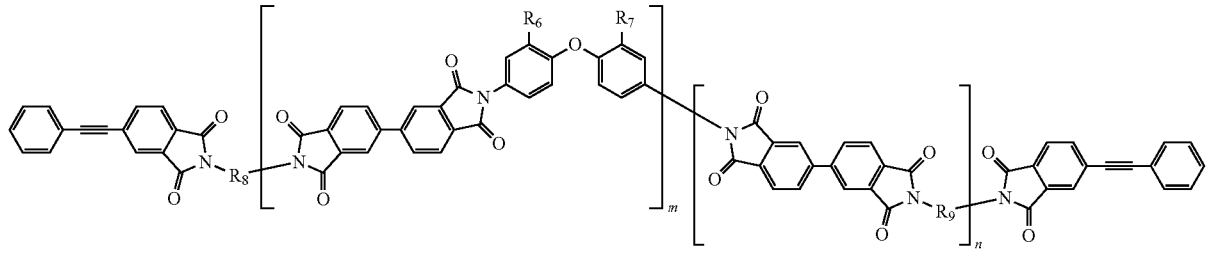

(6)

(In the formula (6), $R_6$ and $R_7$ are a hydrogen atom or a phenyl group; one of $R_6$ and $R_7$ is a phenyl group; $R_8$ and $R_9$ are the same or different and are a divalent aromatic diamine residue; m and n satisfy relations of $m \geq 1$, $n \geq 0$, $1 \leq m+n \leq 10$, and $0.05 \leq m/(m+n) \leq 1$; and repeating units are optionally arranged in a block sequence or a random sequence.)

To produce the terminally modified imide oligomer, the varnish is stirred and reacted at a reaction temperature of 30 to 150° C. for about 1 to 180 minutes to give the terminally modified amic acid oligomer. The reaction solution is then further stirred at 140 to 275° C. for 5 minutes to 24 hours to give the terminally modified imide oligomer and to remove the organic solvent in the reaction solution. If necessary, the reaction solution is cooled to around room temperature, and the terminally modified imide oligomer is crystallized. The crystal is subjected to solid-liquid separation by filtration, for example, giving a solid imide resin composition.

The solid imide resin composition preferably has a minimum melt viscosity of 10,000 Pa·sec or less, more preferably 5,000 Pa·sec or less, and even more preferably 3,000 Pa·sec or less in order that when the organic solvent in prepregs is removed out of the system under high temperature conditions in a step of molding a fiber-reinforced composite material, the remaining imide oligomer is melted and infiltrated into fibers. The minimum melt viscosity is determined by the method described later.

The terminally modified imide oligomer included in the imide resin composition of the present invention has substantially no possibility of undergoing hydrolysis, thus causes no viscosity reduction or other deteriorations as compared with amic acid oligomers, and can be stably stored for a long period of time without additives.

The terminally modified imide oligomer may be mixed with other oligomers having different molecular weights or with thermoplastic polyimides.

The thermoplastic polyimide is a polyimide that becomes soft by heat, and specifically may be any commercial product without any limitation in terms of type and the like.

(Molded Article)

The solid imide resin composition can be further heated in a molten state to give a molded article of an imide resin composition, having a higher molecular weight.

For example, the molded article can be produced by melting the solid imide resin composition at a temperature of 200 to 280° C. and thermally curing the molten composition at 280 to 500° C. for about 10 minutes to 40 hours. The molded article can also be produced by a single step of heating a varnish applied onto a support at 280 to 500° C. for about 10 minutes to 40 hours.

The molded article preferably has a Tg of 300° C. or more, more preferably 330° C. or more, and even more preferably 350° C. or more, for example, when used as high temperature members around the engines of aircraft.

Polymerization of the imide resin composition can be observed by the method described in examples. The degree of high molecular weight is not limited specifically.

The molded article can be molded into a desired shape by a known method. The shape is exemplified by a film shape, a sheet shape, shapes molded into three dimensional shapes such as a rectangular solid shape and a rod-like shape, but is not limited to particular shapes. For example, a molded article molded into a film preferably has a tensile elongation at break of 10% or more, more preferably 15% or more, and even more preferably 20% or more in order to absorb the energy of external impact to reduce damage when the molded article is used as a cured resin molded article or a fiber-reinforced composite material.

The Tg and the tensile elongation at break are determined by the methods described in examples.

The molded article of the imide resin composition is preferably colored transparent from the viewpoint of the uniformity of curing reaction and reaction completion.

(Prepreg)

The prepreg of the present invention is produced by infiltrating the varnish into fibers.

The prepreg of the present invention can be obtained as follows, for example.

For example, the material compositions (A), (B), and (C) are uniformly dissolved at a high concentration of a total amount of 50% by weight or more to give a varnish. If necessary, the varnish is appropriately concentrated or diluted, and then is infiltrated into fibers arranged in one direction in a planer shape or a fiber fabric, yielding a wet prepreg. The wet prepreg may be dried by a known method, giving a dry prepreg. The prepreg of the present invention includes the wet prepreg and the dry prepreg.

In order that a fiber-reinforced composite material produced by using the prepreg exhibits excellent mechanical strength due to the balance between a cured resin and fibers in the fiber-reinforced composite material, the amount of the terminally modified imide oligomer represented by General Formula (3) attached to the fibers is preferably 10 to 60% by weight, more preferably 20 to 50% by weight, and even more preferably 30 to 50% by weight, relative to the total weight of the prepreg.

In order to easily handle the prepregs at the time of stacking and to prevent the resin from flowing out in a step of molding a composite material at a high temperature to produce a fiber-reinforced composite material exhibiting excellent mechanical strength, the amount of the organic solvent attached to fibers is preferably 1 to 30% by weight, more preferably 5 to 25% by weight, and even more preferably 5 to 20% by weight relative to the total weight of the prepreg.

Examples of the fibers used in the present invention include inorganic fibers such as carbon fibers, glass fibers, metal fibers, and ceramic fibers; and synthetic organic fibers such as polyamide fibers, polyester fibers, polyolefin fibers, and novoloid fibers. These fibers may be used as a single type or a combination of two or more types. In particular, in order to achieve excellent mechanical characteristics, carbon fibers are desirable. If having a carbon content ranging from 85 to 100% by weight and having a continuous fiber form that at least partially has a graphite structure, any type of carbon fibers can be used without any limitation, and examples of the carbon fibers include polyacrylonitrile (PAN)-based carbon fibers, rayon-based carbon fibers, lignin-based carbon fibers, and pitch-based carbon fibers. Among them, carbon fibers such as PAN-based carbon fibers and pitch-based carbon fibers are preferred because they are generally used and inexpensive and have high strength. Typically, the carbon fibers have been subjected to sizing treatment. Such fibers may be used without any treatment or may be washed with an organic solvent or the like to remove the sizing agent, as necessary. It is preferable that fiber bundles be opened with air, rollers, or other means in advance and the resin or a resin solution be infiltrated between single yarns of the carbon fibers.

(Imide Prepreg)

The imide prepreg of the present invention is produced by further heating the prepreg.

The imide prepreg of the present invention can be obtained as follows, for example.

A solution of the wet prepreg or the dry prepreg in an organic solvent is heated at 140 to 275° C. for 5 minutes to 24 hours to partially or completely remove the organic solvent, yielding an imide wet prepreg or an imide dry prepreg in which the terminally modified imide oligomer is attached to the fibers.

The amount of the terminally modified imide oligomer attached to the fibers in the imide wet prepreg is preferably 5 to 50% by weight, more preferably 20 to 50% by weight, and even more preferably 30 to 50% by weight relative to the total weight of the prepreg. The amount of the organic solvent attached to the fibers is preferably 1 to 30% by weight, more preferably 5 to 25% by weight, and even more preferably 5 to 20% by weight relative to the total weight of the prepreg.

The amount of the terminally modified imide oligomer attached to the fibers in the imide dry prepreg is preferably 20 to 80% by weight, more preferably 20 to 60% by weight, and even more preferably 30 to 50% by weight relative to the total weight of the prepreg.

The fibers used in the imide prepreg of the present invention may be the same as the fibers used in the above described prepreg. The fiber material constituting the imide prepreg has a structure of a continuous fiber form such as UD (unidirectional) forms, weave forms (plain weave, satin weave, for example), and knit forms, and is not limited to particular forms. The form can be appropriately selected depending on the purpose. The forms may be used singly or in combination of two or more of them.

(Fiber-Reinforced Composite Material)

The fiber-reinforced composite material of the present invention can be obtained as follows, for example.

A predetermined number of the prepregs are stacked and thermally cured with an autoclave, a hot press, or a similar apparatus at a temperature of 80 to 500° C. at a pressure of 1 to 1,000 kg/cm² for about 10 minutes to 40 hours, giving a fiber-reinforced composite material. In the present invention, in addition to the use of the prepreg, the imide wet prepregs or the imide dry prepregs may be stacked and thermally cured in the same manner as the above, giving a fiber-reinforced composite material.

The fiber-reinforced composite material of the present invention obtained as above preferably has a glass transition temperature (Tg) of 300° C. or more. The measurement is in accordance with the method described later.

The film-like molded article of the imide resin composition or the imide prepreg may be inserted between a fiber-reinforced composite material and a different material, and the whole may be heated and melted to be integrated, giving a fiber-reinforced composite material structure. Here, the different material is not limited to particular materials and may be any material commonly used in the field. Examples of the material include honeycomb metal materials and sponge-like core materials.

EXAMPLES

Some examples will next be described in order to explain the present invention, but are not intended to limit the present invention. The characteristics were determined in the following conditions.

<Test Methods>

(1) Measurement of Proton Nuclear Magnetic Resonance Spectroscopy ($^1$H-NMR)

A nuclear magnetic resonance spectrometer (model: AV-400M, manufactured by Bruker Corporation) was used for measurement at 30° C. As the deuterated solvent for measurement, deuterated dimethyl sulfoxide (DMSO-$d_6$) or deuterated methanol (MeOH-$d_4$) was used. As the standard for chemical shift values, the proton signal of the methyl group of trimethylsilane contained in the deuterated solvent was regarded as 0 ppm.

(2) Measurement of Glass Transition Temperature (Tg)

A differential scanning calorimeter (DSC, model: DSC-2010, manufactured by TA Instruments) was used for measurement under a nitrogen stream at a temperature increase rate of 5° C./min. For film-like products, a dynamic viscoelasticity analyzer (DMA, model: RSA-II, manufactured by Rheometric) was used for measurement at a temperature increase rate of 10° C./min at a frequency of 1 Hz. The intersection of two tangent lines before and after the drop of a storage elastic modulus curve was regarded as the glass transition temperature. For fiber-reinforced composite materials, a dynamic viscoelasticity analyzer (DMA, model: DMA-Q-800, manufactured by TA Instruments) was used for measurement in a cantilever manner at a strain of 0.1% at a frequency of 1 Hz under a nitrogen stream at a temperature increase rate of 3° C./min. The intersection of two tangent lines before and after the drop of a storage elastic modulus curve was regarded as the glass transition temperature.

(3) Measurement of Minimum Melt Viscosity

A rheometer (model: AR2000, manufactured by TA Instruments) was used for measurement with a 25-mm parallel plate at a temperature increase rate of 4° C./min.

(4) Measurement of 5% Weight Loss Temperature

A thermogravimetric analyzer (TGA, model: SDT-2960, manufactured by TA Instruments) was used for measurement under a nitrogen stream at a temperature increase rate of 5° C./min.

(5) Elastic Modulus Measurement, Breaking Strength Measurement, Breaking Elongation Measurement A tensilon versatile testing machine (trade name: TENSILON/UTM-II-20, manufactured by ORIENTEC Co., Ltd.) was used for measurement at room temperature at a tensile speed of 3 mm/min. The test pieces had a film-like shape having a length of 20 mm, a width of 3 mm, and a thickness of 80 to 120 μm.

(6) Measurement of Infrared Absorption Spectrum

A FT/IR-230S spectrometer manufactured by JASCO Corporation was used for infrared absorption spectrum measurement at room temperature in a measurement range of 400 cm$^{-1}$ to 4,000 cm$^{-1}$ at an accumulation number of 32.

(7) Measurement of Solution Viscosity

An E-type viscometer, model R550 manufactured by Toki Sangyo Co., Ltd., was used for measurement at 23° C.

(8) Ultrasonic Defect Test

An ultrasonic defect tester, model SDS7800R manufactured by KRAUTKRAMER, was used for measurement with a 5- to 15-MHz testing probe in water.

(9) Optical Microscope Observation

A measuring microscope, STM-MJS manufactured by Olympus Corporation, was used for measurement at a magnification of 50 to 1,000.

(10) Measurement of Interlaminar Shear Strength

Measurement was carried out in accordance with ASTM-D2344.

<(A) Production of Aromatic Tetracarboxylic Acid Diester Compound>

Production Example 1

Into a 2,000-mL four-necked flask equipped with a thermometer, a stirrer, a nitrogen inlet tube, and a reflux condenser, 500 g (2.29 mol) of 1,2,4,5-benzenetetracarboxylic dianhydride was placed, and 1,200.13 g (37.5 mol) of methanol was added. Under a nitrogen stream, the resulting suspension was stirred while heated and refluxed at 80° C. After the start of stirring, 1,2,4,5-benzenetetracarboxylic dianhydride was observed to be gradually dissolved in the solvent, and at about 60 minutes after the start of stirring, the compound was completely dissolved. When the solution was further continuously stirred, some insoluble precipitate was observed in the solvent. At 120 minutes after the start of stirring, the heating was stopped, and the mixture was cooled to room temperature, giving a suspension solution. Methanol was then volatilized at room temperature under a vacuum condition, giving a product as white powder. The $^1$H-NMR measurement (in a DMSO-d$_6$ solvent) of the obtained product revealed that the product was an isomer mixture containing about 40% of 1,2,4,5-benzenetetracarboxylic acid dimethyl ester in which two ester groups were located in a cis configuration and about 60% of 1,2,4,5-benzenetetracarboxylic acid dimethyl ester in which two ester groups were located in a trans configuration. The obtained aromatic tetracarboxylic acid diester compound was represented by General Formula (1) in which R$_2$ was a methyl group and R$_3$ was a methyl group.

Production Example 2

In the same manner as the above, into a 2,000-mL four-necked flask equipped with a thermometer, a stirrer, a nitrogen inlet tube, and a reflux condenser, 500 g (2.29 mol) of 1,2,4,5-benzenetetracarboxylic dianhydride was placed, and 1,200.10 g (26.05 mol) of ethanol was added. Under a nitrogen stream, stirring of the resulting suspension was started while the suspension was heated and refluxed at 105° C. After the start of stirring, 1,2,4,5-benzenetetracarboxylic dianhydride was observed to be gradually dissolved in the solvent, and at about 60 minutes after the start of stirring, the compound was completely dissolved. When the solution was further continuously stirred, some insoluble precipitate was observed in the solvent. At 120 minutes after the start of stirring, the heating was stopped, and the mixture was cooled to room temperature, giving a suspension solution. Then, ethanol was volatilized at room temperature under a vacuum condition, giving a product as white powder. The $^1$H-NMR measurement (in a DMSO-d$_6$ solvent) of the obtained product revealed that the product was an isomer mixture containing about 34% of 1,2,4,5-benzenetetracarboxylic acid diethyl ester in which two ester groups were located in a cis configuration and about 66% of 1,2,4,5-benzenetetracarboxylic acid diethyl ester in which two ester groups were located in a trans configuration. The obtained aromatic tetracarboxylic acid diester compound was represented by General Formula (1) in which R$_2$ was an ethyl group and R$_3$ was an ethyl group.

Production Example 3

In the same manner as the above, into a 2,000-mL four-necked flask equipped with a thermometer, a stirrer, a nitrogen inlet tube, and a reflux condenser, 500 g (2.29 mol) of 1,2,4,5-tetracarboxylic dianhydride was placed, and 1,202.00 g (20.00 mol) of 2-propanol was added. Under a nitrogen stream, stirring of the resulting suspension was started while the suspension was heated and refluxed at 105° C. After the start of stirring, 1,2,4,5-tetracarboxylic dianhydride was observed to be gradually dissolved in the solvent, and at about 180 minutes after the start of stirring, the compound was completely dissolved. When the solution was further continuously stirred, some insoluble precipitate was observed in the solvent. At 120 minutes after the start of stirring, the heating was stopped, and the mixture was cooled to room temperature, giving a suspension solution. Then, 2-propanol was volatilized at room temperature under a vacuum condition, giving a product as white powder. The $^1$H-NMR measurement (in a DMSO-d$_6$ solvent) of the obtained product revealed that the product was an isomer mixture containing about 50% of 1,2,4,5-tetracarboxylic acid diisopropyl ester in which two ester groups were located in a cis configuration and about 50% of 1,2,4,5-tetracarboxylic acid diisopropyl ester in which two ester groups were located in a trans configuration.

<(C) Production of 4-(2-phenylethynyl)phthalic Acid Monoester Compound>

Production Example 4

In the same manner as the above, into a 2,000-mL four-necked flask equipped with a thermometer, a stirrer, a nitrogen inlet tube, and a reflux condenser, 600 g (2.41 mol) of 4-(2-phenylethynyl)phthalic anhydride was placed, and 1,200.25 g (26.05 mol) of ethanol was added. Under a nitrogen stream, stirring of the resulting suspension was started while the suspension was heated and refluxed at 105° C. After the start of stirring, 4-(2-phenylethynyl)phthalic anhydride was observed to be gradually dissolved in the solvent, and at about 10 minutes after the start of stirring, the compound was completely dissolved. The solution was further continuously stirred, then at 120 minutes after the start of stirring, the heating was stopped, and the mixture was cooled to room temperature. Ethanol was then volatilized at room temperature under a vacuum condition, giving 4-(2-phenylethynyl)phthalic acid monoethyl ester as white powder. The DSC measurement result of the obtained product revealed that the melting point was 130° C.

The obtained 4-(2-phenylethynyl)phthalic acid monoethyl ester was represented by General Formula (2) in which $R_4$ and $R_5$ were a hydrogen atom or an ethyl group, and one of $R_4$ and $R_5$ was an ethyl group.

Example 1

Into a 100-mL sample bottle, 4.446 g (16.1 mmol) of 2-phenyl-4,4'-diaminodiphenyl ether (B) and 6.8 g (212.2 mmol) of methanol were placed and completely dissolved, and then 4.000 g (12.9 mmol) of 1,2,4,5-benzenetetracarboxylic acid diethyl ester (A) produced in Production Example 2 and 1.913 g (6.5 mmol) of 4-(2-phenylethynyl) phthalic acid monoethyl ester (C) produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and at 24 hours after the start of stirring, the stirring was stopped, giving a varnish in which a terminally modified polyimide resin material composition was uniformly dissolved in methanol.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while methanol was removed, yielding a terminally modified imide oligomer. The obtained terminally modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=4 and n=0 on average.

The powdery terminal-modified imide oligomer before curing had a Tg of 210° C. from DSC measurement result and had a minimum melt viscosity of 62 Pa·sec (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 96 μm). IR spectrum measurement of some of the film-like imide resin composition showed the disappearance of the absorption around 2,210 $cm^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 337° C. by DSC measurement, a Tg of 336° C. by DMA measurement, and a 5% weight loss temperature of 538° C. by TGA. As for the mechanical characteristics by tensile test, the film-like cured product had an elastic modulus of 3.1 GPa, a breaking strength of 143 MPa, and a breaking elongation of 31%.

The varnish obtained above was dried under vacuum at room temperature, giving a powdered terminal-modified polyimide resin material composition. The powder was smoothly dissolved in MeOH-$d_4$ and was subjected to $^1$H-NMR measurement. As shown in FIG. 1, the signals were observed at positions different from those of the proton signals corresponding to 1,2,4,5-benzenetetracarboxylic acid dimethyl ester, 2-phenyl-4,4'-diaminodiphenyl ether, and 4-(2-phenylethynyl)phthalic acid monomethyl ester used in the example. The powder was dissolved in DMSO-$d_6$ and was subjected to $^1$H-NMR measurement. As shown in FIG. 2, the signals were observed at exactly the same positions as those of the proton signals corresponding to 1,2,4,5-benzenetetracarboxylic acid dimethyl ester, 2-phenyl-4,4'-diaminodiphenyl ether, and 4-(2-phenylethynyl) phthalic acid monomethyl ester used in the example, and no NH proton signal of the amido group was observed in a signal range from 1 to 14 δ/ppm. These results revealed that all the components included in the terminally modified polyimide resin material composition formed ion complexes (salts) in the varnish in the methanol solution prepared in the example.

Comparative Example 1

Into a 100-mL three-necked flask equipped with a thermometer, a stirrer, and a nitrogen inlet tube, 2.7613 g (10 mmol) of 2-phenyl-4,4'-diaminodiphenyl ether and 10 mL of N-methyl-2-pyrrolidone were added and dissolved. Next, 1.7450 g (8 mmol) of 1,2,4,5-benzenetetracarboxylic dianhydride and 0.8 mL of N-methyl-2-pyrrolidone (boiling point: about 204° C.) were added. Under a nitrogen stream, the mixture was polymerized at room temperature for 2.5 hours, then at 60° C. for 1.5 hours, and at room temperature for 1 hour, giving an amic acid oligomer. To the reaction solution, 0.9929 g (4 mmol) of 4-(2-phenylethynyl)phthalic anhydride was added. Under a nitrogen stream, the mixture was reacted at room temperature for 12 hours to undergo terminal modification, and subsequently was stirred at 195° C. for 5 hours to undergo imide bond formation.

After cooling, the reaction solution was poured into 900 mL of ion-exchanged water, and precipitated powder was collected by filtration. The powder was washed with 80 mL of methanol for 30 minutes, and the powder obtained by filtration was dried under reduced pressure at 130° C. for a day, giving a product. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=4 and n=0 on average.

The powdery terminal-modified imide oligomer before curing had a Tg of 213° C. from DSC measurement result and had a minimum melt viscosity of 150 Pa·sec (343° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 100 μm). IR spectrum measurement of some of the film-like imide resin composition showed the disappearance of the absorption around 2,210 $cm^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The obtained film-like cured product had a Tg of 346° C. by DSC measurement, a Tg of 343° C. by DMA measurement, and a 5% weight loss temperature of 538° C. by TGA. As for the mechanical characteristics by tensile test, the film-like cured product had an elastic modulus of 3.2 GPa, a breaking strength of 132 MPa, and a breaking elongation of 16%.

Comparative Example 2

Into a 100-mL four-necked flask equipped with a thermometer, a stirrer, a nitrogen inlet tube, and a reflux condenser, 4.905 g (17.8 mmol) of 2-phenyl-4,4'-diaminodiphenyl ether and 10 mL of N-methyl-2-pyrrolidone were added and dissolved. Next, 4.007 g (14.2 mmol) of 1,2,4,5-benzenetetracarboxylic acid dimethyl ester produced in Production Example 1, 1.990 g (7.1 mmol) of 4-(2-phenylethynyl) phthalic acid monoethyl ester produced in Production Example 4, and 0.8 mL of N-methyl-2-pyrrolidone were added. Under a nitrogen stream, the mixture was stirred at 60° C. for 3 hours to undergo amic acid bond formation reaction. The mixture was then reacted under a nitrogen stream at 200° C. for 5 hours to undergo imide bond formation reaction.

After cooling, the reaction solution was poured into 900 mL of ion-exchanged water, and precipitated powder was collected by filtration. The powder was washed with 80 mL of methanol for 30 minutes, and the powder obtained by filtration was dried under reduced pressure at 240° C. for 5 hours, giving a product. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=4 and n=0 on average.

The powdery terminal-modified imide oligomer before curing had a Tg of 217° C. from DSC measurement result and had a minimum melt viscosity of 216 Pa·sec (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 86 μm). IR spectrum measurement of some of the film-like imide resin composition showed the disappearance of the absorption around 2,210 cm$^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 336° C. by DSC measurement, a Tg of 346° C. by DMA measurement, and a 5% weight loss temperature of 538° C. by TGA. As for the mechanical characteristics by tensile test, the film-like cured product had an elastic modulus of 2.8 GPa, a breaking strength of 128 MPa, and a breaking elongation of 18%.

Example 2

Into a 100-mL sample bottle, 4.008 g (14.5 mmol) of 2-phenyl-4,4'-diaminodiphenyl ether (B), 0.562 g (1.62 mmol) of 9,9-bis(4-(4-aminophenoxy)phenyl)fluorene, and 7.0 g (218.4 mmol) of methanol were placed and completely dissolved, and then 4.000 g (12.9 mmol) of 1,2,4,5-benzenetetracarboxylic acid diethyl ester (A) produced in Production Example 2 and 1.913 g (6.5 mmol) of 4-(2-phenylethynyl)phthalic acid monoethyl ester (C) produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and at 24 hours after the start of stirring, the stirring was stopped, giving a varnish in which the raw material composition of the terminally modified polyimide resin was uniformly dissolved in methanol.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while methanol was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ was a 2-phenyl-4,4'-diaminodiphenyl ether residue or a 9,9-bis(4-aminophenyl)fluorene residue, $R_9$ was a 9,9-bis(4-aminophenyl)fluorene residue, and m=3.6 and n=0.4 on average.

The powdery terminal-modified imide oligomer before curing had a Tg of 221° C. from DSC measurement result and had a minimum melt viscosity of 94 Pa·sec (345° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 80 μm). IR spectrum measurement of some of the film-like imide resin composition showed the disappearance of the absorption around 2,210 cm$^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 355° C. from DSC measurement result, a Tg of 357° C. from DMA measurement result, and a 5% weight loss temperature of 537° C. by TGA. As for the mechanical characteristics by tensile test, the film-like cured product had an elastic modulus of 3.2 GPa, a breaking strength of 137 MPa, and a breaking elongation of 20%.

The varnish obtained above was dried under vacuum at room temperature, giving a powdered raw material composition of the terminally modified polyimide resin. The powder was smoothly dissolved in MeOH-d$_4$ and was subjected to $^1$H-NMR measurement in the same manner as in Example 1. The result revealed that all the components included in the raw material composition of the terminally modified polyimide resin formed ion complexes (salts) in the varnish in the methanol solution prepared in the example.

Example 3

Into a 100-mL sample bottle, 3.664 g (13.2 mmol) of 2-phenyl-4,4'-diaminodiphenyl ether (B), 0.514 g (1.48 mmol) of 9,9-bis(4-(4-aminophenoxy)phenyl)fluorene, and 6.0 g (185.2 mmol) of methanol were placed and completely dissolved, and then 4.000 g (12.9 mmol) of 1,2,4,5-benzenetetracarboxylic acid diethyl ester (A) produced in Production Example 2 and 1.060 g (3.6 mmol) of 4-(2-phenylethynyl)phthalic acid monoethyl ester (C) produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and at 24 hours after the start of stirring, the stirring was stopped, giving a varnish in which the raw material composition of the terminally modified polyimide resin was uniformly dissolved in methanol.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while methanol was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ was a 2-phenyl-4,4'-diaminodiphenyl ether residue or a 9,9-bis(4-aminophenyl)fluorene residue, $R_9$ was a 9,9-bis(4-aminophenyl)fluorene residue, and m=6.3 and n=0.7 on average.

The powdery terminal-modified imide oligomer before curing had a Tg of 247° C. from DSC measurement result and had a minimum melt viscosity of 2,036 Pa·sec (366° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 90 μm). IR spectrum measurement of some of the film-like imide resin composition showed the disappearance of the absorption around 2,210 cm$^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 357° C. from DSC measurement result, a Tg of 355° C. from DMA measurement result, and a 5% weight loss temperature of 543° C. by TGA. As for the mechanical characteristics by tensile test, the film-like cured product had an elastic modulus of 3.1 GPa, a breaking strength of 142 MPa, and a breaking elongation of 24%.

The varnish obtained above was dried under vacuum at room temperature, giving a powdered raw material composition of the terminally modified polyimide resin. The powder was smoothly dissolved in MeOH-d$_4$ and was subjected to $^1$H-NMR measurement in the same manner as in Example 1. The result revealed that all the components included in the raw material composition of the terminally modified polyimide resin formed ion complexes (salts) in the varnish in the methanol solution prepared in the example.

Example 4

Into a 100-mL sample bottle, 4.541 g (14.00 mmol) of 1,2,4,5-benzenetetracarboxylic acid diisopropyl ester produced in Production Example 3, 1.177 g (4.00 mmol) of 4-(2-phenylethynyl)phthalic acid monoethyl ester produced in Production Example 4, and 3.4 g (73.8 mmol) of ethanol were placed. The container was purged with nitrogen and sealed, and the resulting suspension was continuously stirred at about 70° C. At 60 minutes after the start of stirring, 4.421 g (16.0 mmol) of 2-phenyl-4,4'-diaminodiphenyl ether was added, and the stirring was continued. After about 30 minutes, the stirring was stopped, giving a varnish in which the raw material composition of the terminally modified polyimide resin was uniformly dissolved in ethanol.

The varnish was placed in a glass petri dish. By heating the varnish in a circulation air oven at an internal temperature of 60° C. for 3 hours and further heating the varnish at 250° C. for 1 hour, amic acid bond formation reaction and imide bond formation reaction were carried out while ethanol was removed, yielding a terminal-modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=7 and n=0 on average.

The powdery terminal-modified imide oligomer before curing had a Tg of 245° C. from DSC measurement result and had a minimum melt viscosity of 400 Pa·s (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 96 μm). IR spectrum measurement of some of the film-like imide resin composition showed the disappearance of the absorption around 2,210 cm$^{-1}$ assigned to the stretching vibration of the triple bond in PEPA as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 334° C. by DSC measurement, a Tg of 335° C. by DMA measurement, and a 5% weight loss temperature of 538° C. by TGA. As for the mechanical characteristics by tensile test, the film-like cured product had an elastic modulus of 3.1 GPa, a breaking strength of 141 MPa, and a breaking elongation of 35%.

Example 5

In the same manner as the above, into a 2,000-mL four-necked flask equipped with a thermometer, a stirrer, a nitrogen inlet tube, and a reflux condenser, 366.44 g (1.68 mol) of 1,2,4,5-tetracarboxylic dianhydride was placed, and 89 g (1.93 mol) of ethanol and 89 g (1.48 mol) of 2-propanol were added. Under a nitrogen stream, stirring of the resulting suspension was started while the suspension was heated and refluxed at 105° C. After the start of stirring, 1,2,4,5-tetracarboxylic dianhydride was observed to be gradually dissolved in the solvent, and at about 180 minutes after the start of stirring, all the compounds were uniformly dissolved.

Then, 5 ml of the solution was sampled, the ethanol and the 2-propanol were volatilized at room temperature under a vacuum condition, giving a product as white powder. The $^1$H-NMR measurement (in a DMSO-d$_6$ solvent) of the obtained product revealed that the product was a mixture containing about 76.5% of 1,2,4,5-tetracarboxylic acid diethyl ester, about 1.6% of 1,2,4,5-tetracarboxylic acid diisopropyl ester, and about 21.9% of 1,2,4,5-tetracarboxylic acid monoethyl ester monoisopropyl ester.

To the solution obtained above, 119.16 g (0.48 mol) of 4-(2-phenylethynyl)phthalic acid monoethyl ester produced in Production Example 4 was added. The mixture was purged with nitrogen, then sealed, and continuously stirred at about 70° C. At 30 minutes after the start of stirring, a solution in which the 4-(2-phenylethynyl)phthalic acid monoethyl ester was uniformly dissolved was obtained. To the solution, 530.57 g (1.92 mol) of 2-phenyl-4,4'-diaminodiphenyl ether was added, and the stirring was continued. After about 30 minutes, the stirring was stopped, giving a varnish in which the raw material composition of the terminally modified polyimide resin was uniformly dissolved in ethanol.

The varnish was placed in a glass petri dish. By heating the varnish in a circulation air oven at an internal temperature of 60° C. for 3 hours and further heating the varnish at 250° C. for 1 hour, amic acid bond formation reaction and imide bond formation reaction were carried out while ethanol was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=7 and n=0 on average.

The powdery terminal-modified imide oligomer before curing had a Tg of 245° C. from DSC measurement result and had a minimum melt viscosity of 410 Pa·s (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 86 μm). IR spectrum measurement of some of the film-like imide resin composition showed the disappearance of the absorption around 2,210 $cm^{-1}$ assigned to the stretching vibration of the triple bond in PEPA as the terminal group of the modified imide oligomer, and this indicated that the pressurized thermoforming allowed the terminally modified imide oligomer component in the film-like imide resin composition to undergo thermal addition reaction and to be polymerized. The film-like cured product had a Tg of 332° C. by DSC measurement, a Tg of 333° C. by DMA measurement, and a 5% weight loss temperature of 538° C. by TGA. As for the mechanical characteristics by tensile test, the film-like cured product had an elastic modulus of 3.2 GPa, a breaking strength of 144 MPa, and a breaking elongation of 33%.

Example 6

Into a 100-mL sample bottle, 4.446 g (16.1 mmol) of 2-phenyl-4,4'-diaminodiphenyl ether (B) and 6.8 g (117.1 mmol) of acetone were placed and completely dissolved, and then 4.000 g (12.9 mmol) of 1,2,4,5-benzenetetracarboxylic acid diethyl ester (A) produced in Production Example 2 and 1.913 g (6.5 mmol) of 4-(2-phenylethynyl)phthalic acid monoethyl ester (C) produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and at 24 hours after the start of stirring, the stirring was stopped, giving a varnish in which the raw material composition of the terminally modified polyimide resin was uniformly dissolved in acetone.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while acetone was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=4 and n=0 on average.

The powdery terminal-modified imide oligomer before curing had a Tg of 210° C. from DSC measurement result and had a minimum melt viscosity of 80 Pa·sec (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 90 μm). From IR spectrum measurement of some of the film-like imide resin composition, the phenylethynyl moiety as the terminal group of the terminally modified imide oligomer indicated that the pressurized thermoforming allowed the terminally modified imide oligomer component in the film-like imide resin composition to undergo thermal addition reaction and to be polymerized. The film-like cured product had a Tg of 342° C. by DSC measurement, a Tg of 338° C. by DMA measurement, and a 5% weight loss temperature of 538° C. by TGA. As for the mechanical characteristics by tensile test, the film-like cured product had an elastic modulus of 3.1 GPa, a breaking strength of 140 MPa, and a breaking elongation of 28%.

Example 7

Into a 100-mL sample bottle, 4.541 g (14.00 mmol) of 0,2,4,5-benzenetetracarboxylic acid diisopropyl ester produced in Production Example 3, 1.177 g (4.00 mmol) of 4-(2-phenylethynyl)phthalic acid monoethyl ester produced in Production Example 4, and 3.4 g (38.6 mmol) of 1,4-dioxane were placed. The container was purged with nitrogen and sealed, and the resulting suspension was continuously stirred at about 70° C. At 60 minutes after the start of stirring, 4.421 g (16.0 mmol) of 2-phenyl-4,4'-diaminodiphenyl ether was added, and the stirring was continued. After about 30 minutes, the stirring was stopped, giving a varnish in which the raw material composition of the terminally modified polyimide resin was uniformly dissolved in ethanol.

The varnish was placed in a glass petri dish. By heating the varnish in a circulation air oven at an internal temperature of 100° C. for 3 hours and further heating the varnish at 250° C. for 1 hour, amic acid bond formation reaction and imide bond formation reaction were carried out while 1,4-dioxane was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue, and m=7 and n=0 on average.

The powdery terminal-modified imide oligomer before curing had a Tg of 244° C. from DSC measurement result and had a minimum melt viscosity of 380 Pa·s (340° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 96 μm). IR spectrum measurement of some of the film-like imide resin composition showed the disappearance of the absorption around 2,210 cm$^{-1}$ assigned to the stretching vibration of the triple bond in PEPA as the terminal group of the terminally modified imide oligomer, and this indicated that the pressurized thermoforming allowed the terminally modified imide oligomer component in the film-like imide resin composition to undergo thermal addition reaction and to be polymerized. The film-like cured product had a Tg of 340° C. by DSC measurement, a Tg of 338° C. by DMA measurement, and a 5% weight loss temperature of 538° C. by TGA. As for the mechanical characteristics by tensile test, the film-like cured product had an elastic modulus of 3.1 GPa, a breaking strength of 139 MPa, and a breaking elongation of 32%.

Comparative Example 3

Into a 100-mL three-necked flask equipped with a thermometer, a stirrer, and a nitrogen inlet tube, 3.484 g (12.6 mmol) of 2-phenyl-4,4'-diaminodiphenyl ether, 0.488 g (1.4 mmol) of 9,9-bis(4-(4-aminophenoxy)phenyl)fluorene, and 10 mL of N-methyl-2-pyrrolidone were placed and dissolved. Next, 2.619 g (12.0 mmol) of 1,2,4,5-benzenetetracarboxylic dianhydride and 0.8 mL of N-methyl-2-pyrrolidone were added. Under a nitrogen stream, the mixture was polymerized at room temperature for 2.5 hours, then at 60° C. for 1.5 hours, and at room temperature for 1 hour, giving an amic acid oligomer. To the reaction solution, 0.993 g (4 mmol) of 4-(2-phenylethynyl)phthalic anhydride was added. Under a nitrogen stream, the mixture was reacted at room temperature for 12 hours to undergo terminal modification and subsequently was stirred at 195° C. for 5 hours to undergo imide bond formation.

After cooling, the reaction solution was poured into 900 mL of ion-exchanged water, and precipitated powder was collected by filtration. The powder was washed with 80 mL of methanol for 30 minutes, and the powder obtained by filtration was dried under reduced pressure at 130° C. for a day, giving a product. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 2-phenyl-4,4'-diaminodiphenyl ether residue or a 9,9-bis(4-aminophenyl)fluorene residue, and m=6 and n=1 on average.

The powdery terminal-modified imide oligomer before curing had a Tg of 213° C. from DSC measurement result and had a minimum melt viscosity of 9,036 Pa·sec (346° C.). Some of the powdery terminal-modified imide oligomer was inserted between two polyimide films (trade name: UPILEX-75S; thickness: 75 μm; size: 15 cm per side; manufactured by Ube Industries, Ltd.) having excellent surface smoothness. The whole was pressurized at 370° C. for 1 hour, then cooled, and released, giving a transparent red-brown film-like cured product (a thickness of 100 μm). IR spectrum measurement of some of the film-like imide resin composition showed the disappearance of the absorption around 2,210 cm$^{-1}$ assigned to the stretching vibration of the triple bond in the phenylethynyl moiety as the terminal group of the terminally modified imide oligomer, and this indicated that the pressurized thermoforming allowed the terminally modified imide oligomer component in the film-like imide resin composition to undergo thermal addition reaction and to be polymerized. The obtained film-like cured product had a Tg of 356° C. by DSC measurement, a Tg of 356° C. by DMA measurement, and a 5% weight loss temperature of 538° C. by TGA. As for the mechanical characteristics by tensile test, the film-like cured product had an elastic modulus of 3.2 GPa, a breaking strength of 132 MPa, and a breaking elongation of 15%.

Each vacuum-dried product of the varnishes obtained in Examples 1 to 7 had excellent solubility in organic solvents such as methanol.

The varnishes obtained in Examples 1 to 7 were allowed to stand in a freezer at −5° C. After several months, the varnishes were taken out and thawed to room temperature. Observation of the solution states indicated no precipitate or gelation. GPC measurement gave the same GPC curves before and after the frozen storage. These results revealed that the varnishes produced by the present invention have excellent long-term storage stability.

Each solid imide resin composition obtained by heating the varnishes obtained in Examples 1 to 7 had a minimum melt viscosity of higher than 300° C., which indicates excellent melt flowability at high temperature and excellent molding processability.

Each film-like molded article obtained by heating the solid imide resin compositions obtained in Examples 1 to 7 in a molten state to be polymerized had a Tg of higher than 300° C. and underwent almost no thermal decomposition even at a high temperature of higher than 500° C. This result reveals that the cured resin moldings have extremely high heat resistance and also have high breaking strength and breaking elongation.

The varnishes obtained in Examples 1 to 7 included organic solvents having lower boiling points than those included in the varnishes obtained in Comparative Examples 1 to 3. It is thus obvious that such organic solvents can be readily removed out of the system for a short period of time, and a polyimide powder having excellent thermal properties can be simply obtained without any special purification operation (reprecipitation).

Production Example 5

Into a 1,000-mL four-necked flask equipped with a thermometer, a stirrer, a nitrogen inlet tube, and a reflux condenser, 80.40 g (368.6 mmol) of 1,2,4,5-tetracarboxylic dianhydride and 26.14 g (105.3 mmol) of 4-(2-phenylethynyl)phthalic anhydride were placed, and 109.00 g (2.36 mol) of ethanol was added. Under a nitrogen stream, stirring of the resulting suspension was started while the suspension was heated and refluxed at 105° C. After the start of stirring, acid anhydrides were observed to be gradually dissolved in the solvent, and at about 60 minutes after the start of stirring, the compounds were completely dissolved. When the solution was further continuously stirred, some insoluble precipitate was observed in the solvent. At 120 minutes after the start of stirring, the heating was stopped, and the mixture was cooled to room temperature, giving a suspension solution. In theory, 1,2,4,5-tetracarboxylic acid diethyl ester as the component (A) and 4-(2-phenylethynyl)phthalic acid monoethyl ester as the component (C) were formed in the suspension solution.

Next, to the suspension solution, 104.77 g (379.1 mmol) of 2-phenyl-4,4'-diaminodiphenyl ether, 14.68 g (42.1 mmol) of 9,9-bis(4-(4-aminophenoxy)phenyl)fluorene, and 17.54 g (547.4 mmol) of methanol were added. The flask was purged with nitrogen and sealed, and stirring of the resulting suspension was started at room temperature. After the start of stirring, the start of gradual dissolution of the precipitate in the solvent was observed, and the precipitate was completely uniformly dissolved at 60 minutes after the start of stirring. The solution was further continuously stirred, and at 24 hours after the start of stirring, the stirring was stopped, giving a varnish (solid content concentration: about 70% by weight) in which the raw material composition of the terminally modified polyimide resin was uniformly dissolved in a mixed solvent of ethanol and methanol.

Example 8

Some of the varnish produced in Production Example 5 was infiltrated into plain-weave fabrics "Besfight IM-600 6K" (a fiber basis weight of 195 g/m, made of carbon fiber) with dimensions of 12.5 cm×12.5 cm manufactured by TOHO TENAX CO., Ltd. that had been desized with acetone, giving 20 wet prepregs to which the raw material composition of the terminally modified polyimide resin was attached. The weight contents of the raw material composition of the terminally modified polyimide resin, solvent, carbon fiber were about 46 wt-%, 12 wt-%, 42 wt-% in the obtained wet prepregs, respectively.

Example 9

By heating three wet prepregs, to which the raw material composition of the terminally modified polyimide resin was attached, produced in Example 8 in a circulation air oven at an internal temperature of 200° C. for 1 hour, amic acid bond formation reaction and imide bond formation reaction were carried out while the alcohol components in the prepregs were removed, giving imide dry prepregs of the terminally modified imide oligomer. The obtained imide dry prepreg had an average terminal-modified imide oligomer content of about 47% by weight and an average carbon fiber content of about 53% by weight.

Visual observation of the appearance of the obtained imide dry prepreg showed that the resin was uniformly attached to the surface and the inside of the carbon fibers, and this indicated the imide prepreg had excellent adhesiveness between the resin and the prepreg.

Example 10

On a stainless steel plate having dimensions of 30 cm×30 cm, a polyimide film was placed as a release film, and 12 wet prepregs of the raw material composition of the terminally modified polyimide resin produced in Example 8 were stacked on the film. A polyimide film and a stainless steel plate were further stacked. The whole was heated on a hot press at a temperature increase rate of about 5° C./min from room temperature to 80° C. and heated at 80° C. for 1 hour. The whole was then heated at a temperature increase rate of about 5° C./min from 80° C. to 200° C. and heated at 200° C. for 1 hour. The whole was further heated at a temperature increase rate of about 5° C./min from 200° C. to 260° C. and heated at 260° C. for 1 hour. Next, the whole was heated under a pressure condition of 1.3 MPa at a temperature increase rate of about 5° C./min to 370° C. and was heated under the same pressure condition at 370° C. for 1 hour. The appearance observation revealed the production of a good fiber-reinforced composite material laminate having very smooth surfaces and containing the resin that was uniformly infiltrated into the fibers. The obtained laminate had a glass transition temperature (DSC) of 356° C., a fiber volume fraction (Vf) of 0.48, and a resin content of 37 wt %.

The DMA measurement and the TGA measurement revealed that the organic solvents having low boiling points, such as ethanol and methanol, contained in the varnishes were completely removed from the obtained fiber-reinforced composite material laminate by the heat treatment.

The obtained fiber-reinforced composite material laminate had a glass transition temperature of higher than 300° C., which indicates excellent heat resistance, and had an interlaminar shear strength of about 70 MPa determined by short beam shear test in a three-point bending manner, which indicates excellent mechanical characteristics.

The inside of the laminate was observed by ultrasonic defect test and by cross section observation under an optical microscope, and no void was observed. This indicates that the fiber-reinforced composite material has extremely high quality.

Comparative Example 4

Into a 100-mL sample bottle, 1.741 g (16.1 mmol) of p-phenylenediamine and 6.8 g (212.2 mmol) of methanol were placed and completely dissolved, and then 4.000 g (12.9 mmol) of 1,2,4,5-benzenetetracarboxylic acid diethyl ester produced in Production Example 2 and 1.913 g (6.5 mmol) of 4-(2-phenylethynyl)phthalic acid monoethyl ester produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and then at 24 hours after the start of stirring, the stirring was stopped, giving a varnish in which the raw material composition of the terminally modified polyimide resin was uniformly dissolved in methanol.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while methanol was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a p-phenylenediamine residue, and m=0 and n=4 on average.

The powdery terminal-modified imide oligomer before curing was not melted even when heated at 300° C. or higher, and failed to give a cured resin film.

Comparative Example 5

Into a 100-mL sample bottle, 4.707 g (16.1 mmol) of 1,3-bis(4-aminophenoxy)benzene and 6.8 g (212.2 mmol) of methanol were placed and completely dissolved, and then 4.000 g (12.9 mmol) of 1,2,4,5-benzenetetracarboxylic acid diethyl ester produced in Production Example 2 and 1.913 g (6.5 mmol) of 4-(2-phenylethynyl)phthalic acid monoethyl ester produced in Production Example 4 were added. The container was purged with nitrogen and sealed, and stirring of the resulting suspension was started at room temperature. After the start of stirring, the start of gradual dissolution of the ester compounds in the solvent was observed, and the compounds were completely uniformly dissolved at 60 minutes after the start of stirring. The solution was further continuously stirred, and then at 24 hours after the start of stirring, the stirring was stopped, giving a varnish in which the raw material composition of the terminally modified polyimide resin was uniformly dissolved in methanol.

The varnish was placed in a glass petri dish. By heating the varnish in a circulation air oven at an internal temperature of 60° C. for 3 hours and further heating the varnish at 200° C. for 1 hour, amic acid bond formation reaction and imide bond formation reaction were carried out while methanol was removed, yielding a terminally modified imide oligomer. The obtained terminal-modified imide oligomer was represented by General Formula (5) in which $R_6$ and $R_7$ were a hydrogen atom or a phenyl group, one of $R_6$ and $R_7$ was a phenyl group, $R_8$ and $R_9$ were a 1,3-bis(4-aminophenoxy)benzene residue, and m=0 and n=4 on average.

The powdery terminal-modified imide oligomer before curing was not melted even when heated at 300° C. or higher, and failed to give a cured resin film.

INDUSTRIAL APPLICABILITY

The present invention can provide a varnish having excellent solubility in organic solvents having low boiling points, such as alcohols, and excellent solution storage stability. The terminally modified imide oligomer produced by using the varnish exhibits excellent moldability, and thermal curing of the oligomer enables the production of a cured product having high heat resistance, toughness, and mechanical characteristics.

When a prepreg or an imide prepreg prepared by infiltrating the varnish into fibers is used to form a composite material, the organic solvent can be completely removed during thermal curing, and this enables simple production of a fiber-reinforced composite material having exceptional mechanical strength and high heat resistance. On this account, such materials are usable in wide variety of fields as member materials requiring easy moldability and high heat resistance, including aircraft and apparatuses for the aerospace industry.

The invention claimed is:

1. A varnish comprising components (A) to (D),
the components (A), (B), and (C) being dissolved in the varnish,
the component (A) being an aromatic tetracarboxylic acid diester represented by General Formula (1) and being contained in an amount of 1 to 500 parts by weight,
the component (B) being 2-phenyl-4,4'-diaminodiphenyl ether and being contained in an amount of 1 to 450 parts by weight,
the component (C) being a 4-(2-phenylethynyl)phthalic acid monoester represented by General Formula (2) and being contained in an amount of 1 to 400 parts by weight, and
the component (D) being an organic solvent having a boiling point of 150° C. or less at 1 atmosphere selected from the group consisting of acetone, tetrahydrofuran, 1,4-dioxane, and methyl ethyl ketone, and being contained in an amount of 100 parts by weight; wherein General Formula (1) is

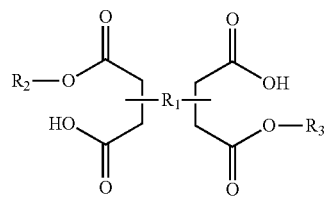

where $R_1$ is an aromatic tetracarboxylic acid diester residue; $R_2$ and $R_3$ are the same or different and are an aliphatic organic group or an aromatic organic group; $R_2$ and $R_3$ are located in a cis configuration or a trans configuration; and the compound is optionally a single isomer or a mixture of two isomers and General Formula (2) is

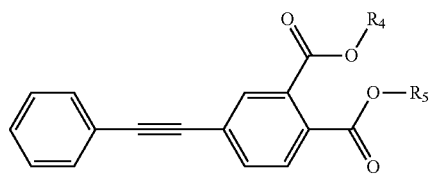

where $R_4$ and $R_5$ are a hydrogen atom, an aliphatic organic group, or an aromatic organic group; and one of $R_4$ and $R_5$ is an aliphatic organic group or an aromatic organic group.

2. The varnish according to claim 1, wherein the aromatic tetracarboxylic acid diester residue represented by $R_1$ in General Formula (1) is a tetravalent residue of a 1,2,4,5-benzenetetracarboxylic acid.

3. The varnish according to claim 1, wherein the aromatic tetracarboxylic acid diester residue represented by $R_1$ in General Formula (1) is a tetravalent residue of a 3,3',4,4'-biphenyltetracarboxylic acid.

4. The varnish according to claim 1, wherein two or more of a tetravalent aromatic tetracarboxylic acid diester represented by General Formula (1) in which $R_1$ is a tetravalent residue of a 1,2,4,5-benzenetetracarboxylic acid, an aromatic tetracarboxylic acid diester represented by General Formula (1) in which $R_1$ is a tetravalent residue of a 3,3',4,4'-biphenyltetracarboxylic acid, and an aromatic tetracarboxylic acid diester represented by General Formula (1) in which $R_1$ is a tetravalent residue of a bis(3,4-carboxyphenyl) ether are used in combination.

5. The varnish according to claim 1, wherein 2-phenyl-4,4'-diaminodiphenyl ether and an additional divalent aromatic diamine are used in combination.

6. A solid imide resin composition represented by General Formula (3), obtained by heating the varnish according to claim 1 to remove the organic solvent:

General Formula (3) is

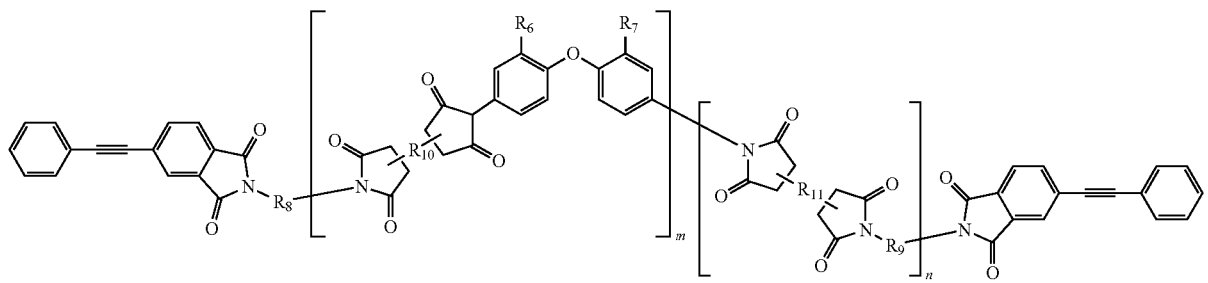

(3)

where $R_6$ and $R_7$ are a hydrogen atom or a phenyl group; one of $R_6$ and $R_7$ is a phenyl group; $R_8$ and $R_9$ are the same or different and are a divalent aromatic diamine residue; $R_{10}$ and $R_{11}$ are the same or different and are a tetravalent aromatic tetracarboxylic acid residue; m and n satisfy relations of $m \geq 1$, $n \geq 0$, $1 \leq m+n \leq 10$, and $0.05 \leq m/(m+n) \leq 1$; and repeating units are optionally arranged in a block sequence or a random sequence.

7. A molded article of a polymerized imide resin composition, wherein the polymerized imide resin composition is obtained by heating the solid imide resin composition according to claim 6 in a molten state.

8. The molded article according to claim 7, wherein the polymerized imide resin composition has a glass transition temperature (Tg) of 300° C. or more.

9. A film obtained from the molded article according to claim 7, having a tensile elongation at break of 10% or more.

10. A prepreg comprising:
the varnish according to claim 1, and fibers,
wherein the varnish is infiltrated in the fibers.

11. An imide prepreg obtained by further heating the prepreg according to claim 10.

12. A fiber-reinforced composite material obtained by stacking the prepregs according to claim 10 and thermally curing the stacked prepregs.

13. The fiber-reinforced composite material according to claim 12, having a glass transition temperature (Tg) of 300° C. or more.

14. A method for producing the varnish according to claim 1, the method comprising:
heating an aromatic tetracarboxylic anhydride and 4-(2-phenylethynyl)phthalic anhydride and dissolving the aromatic tetracarboxylic anhydride and the 4-(2-phenylethynyl)phthalic anhydride in an organic solvent having a boiling point of 150° C. or less at 1 atmosphere, to prepare an aromatic tetracarboxylic acid diester represented by General Formula (1);
preparing a solution of an organic solvent having a boiling point of 150° C. or less at 1 atmosphere, which contains the aromatic tetracarboxylic acid diester represented by General Formula (1) and a 4-(2-phenylethynyl)phthalic acid monoester represented by General Formula (2);
adding a diamine including 2-phenyl-4,4'-diaminodiphenyl ether to the solution; and
uniformly dissolving, in the solution, the diamine including 2-phenyl-4,4'-diaminodiphenyl ether.

15. The varnish according to claim 1, wherein the component (D) comprises a mixture of two or more of the organic solvents.

16. A varnish comprising components (A) to (D),
the components (A), (B), and (C) being dissolved in the varnish,
the component (A) being an aromatic tetracarboxylic acid diester represented by General Formula (1) and being contained in an amount of 1 to 500 parts by weight,
the component (B) being 2-phenyl-4,4'-diaminodiphenyl ether and being contained in an amount of 1 to 450 parts by weight,
the component (C) being a 4-(2-phenylethynyl)phthalic acid monoester represented by General Formula (2) and being contained in an amount of 1 to 400 parts by weight, and
the component (D) being a mixture of two or more of the organic solvents having a boiling point of 150° C. or less at 1 atmosphere selected from the group consisting of acetone, tetrahydrofuran, 1,4-dioxane, and methyl ethyl ketone, and being contained in an amount of 100 parts by weight; wherein
General Formula (1) is

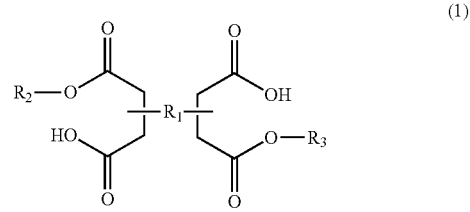

(1)

where $R_1$ is an aromatic tetracarboxylic acid diester residue; $R_2$ and $R_3$ are the same or different and are an aliphatic organic group or an aromatic organic group; $R_2$ and $R_3$ are located in a cis configuration or a trans configuration; and the compound is optionally a single isomer or a mixture of two isomers and
General Formula (2) is

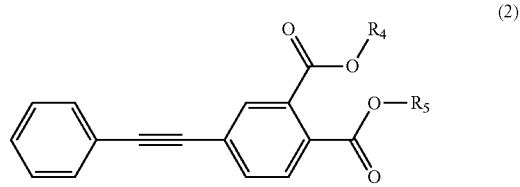

(2)

where $R_4$ and $R_5$ are a hydrogen atom, an aliphatic organic group, or an aromatic organic group; and one of $R_4$ and $R_5$ is an aliphatic organic group or an aromatic organic group.

* * * * *